(12) United States Patent
Asai et al.

(10) Patent No.: US 12,259,320 B2
(45) Date of Patent: Mar. 25, 2025

(54) IMAGING DEVICE

(71) Applicant: Panasonic Intellectual Property Management Co., Ltd., Osaka (JP)

(72) Inventors: Yosuke Asai, Osaka (JP); Kazuhiro Yamada, Osaka (JP); Hiroshi Yamaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 223 days.

(21) Appl. No.: 17/940,372

(22) Filed: Sep. 8, 2022

(65) Prior Publication Data

US 2023/0003643 A1    Jan. 5, 2023

Related U.S. Application Data

(63) Continuation of application No. PCT/JP2020/047117, filed on Dec. 17, 2020.

(30) Foreign Application Priority Data

Mar. 18, 2020    (JP) ................................ 2020-048096

(51) Int. Cl.
  *G01N 21/3581*  (2014.01)
  *G01B 11/30*  (2006.01)

(52) U.S. Cl.
  CPC ....... *G01N 21/3581* (2013.01); *G01B 11/303* (2013.01)

(58) Field of Classification Search
  None
  See application file for complete search history.

(56) References Cited

U.S. PATENT DOCUMENTS 5,517,575 A * 5/1996 Ladewski ............ G01B 11/303
                                                356/601
6,242,740 B1 * 6/2001 Luukanen ............. G01J 3/2823
                                                250/353

(Continued)

FOREIGN PATENT DOCUMENTS

JP       11-225016       8/1999
JP     2001-509269       7/2001

(Continued)

OTHER PUBLICATIONS

International Search Report (ISR) issued on Mar. 9, 2021 in International (PCT) Application No. PCT/JP2020/047117.

(Continued)

*Primary Examiner* — Marcus H Taningco
*Assistant Examiner* — Djura Malevic
(74) *Attorney, Agent, or Firm* — Wenderoth, Lind & Ponack, L.L.P.

(57) ABSTRACT

An imaging device includes: an area light source including an emission surface from which a sub-terahertz wave is emitted to a measurement target; and a detector including an image sensor that receives a reflected wave generated by the measurement target reflecting the sub-terahertz wave emitted from the emission surface. The area light source includes: at least one point light source that emits a sub-terahertz wave; and a reflector that reflects the sub-terahertz wave emitted from the at least one point light source, to generate a sub-terahertz wave to be emitted from the emission surface. The reflector has a reflection surface that is a bumpy surface which includes two or more frequency components in a spatial frequency range and whose roughness curve element mean length RSm is at least 0.3 mm.

10 Claims, 20 Drawing Sheets

(56) References Cited

U.S. PATENT DOCUMENTS

| | | | | |
|---|---|---|---|---|
| 6,353,224 | B1* | 3/2002 | Sinclair | G01V 8/005 250/336.1 |
| 6,777,684 | B1* | 8/2004 | Volkov | G01N 21/3581 343/915 |
| 8,835,849 | B1* | 9/2014 | Williams | G01S 13/89 250/336.1 |
| 8,890,073 | B2* | 11/2014 | Karam | G01S 13/887 250/341.3 |
| 8,957,810 | B2* | 2/2015 | Babakhani | G01S 13/89 342/179 |
| 10,197,451 | B2* | 2/2019 | Weatherall | G01J 5/53 |
| 10,254,397 | B2* | 4/2019 | Kayano | H01Q 1/364 |
| 10,585,185 | B2* | 3/2020 | Ahmed | G01S 13/887 |
| 10,716,488 | B2* | 7/2020 | Ostadrahimi | G01N 22/00 |
| 10,914,863 | B2* | 2/2021 | Price | G01V 13/00 |
| 11,101,828 | B2* | 8/2021 | Dolatsha | H04B 1/0067 |
| 11,385,105 | B2* | 7/2022 | De Muynck | G01J 5/07 |
| 11,852,951 | B2* | 12/2023 | Jacob | G01N 21/3581 |
| 2004/0051828 | A1* | 3/2004 | Sakamoto | G02B 5/10 349/113 |
| 2009/0240139 | A1* | 9/2009 | Yi | A61B 5/0073 600/425 |
| 2014/0253362 | A1* | 9/2014 | Einat | G01S 13/887 342/27 |
| 2022/0224845 | A1* | 7/2022 | Yamada | H04N 23/11 |
| 2023/0003643 | A1* | 1/2023 | Asai | G01J 3/108 |

FOREIGN PATENT DOCUMENTS

| | | |
|---|---|---|
| WO | 98/32035 | 7/1998 |
| WO | 2021/070428 | 4/2021 |

OTHER PUBLICATIONS

Extended European Search Report issued Jun. 26, 2023 in corresponding European Patent Application No. 20925147.9.

* cited by examiner

IMAGING DEVICE

CROSS REFERENCE TO RELATED APPLICATIONS

This is a continuation applications of PCT International Application No. PCT/JP2020/047117 filed on Dec. 17, 2020, designating the United States of America, which is based on and claims priority of Japanese Patent Application No. 2020-048096 filed on Mar. 18, 2020. The entire disclosures of the above-identified applications, including the specifications, drawings and claims are incorporated herein by reference in their entirety.

FIELD

The present invention relates to imaging devices.

BACKGROUND

Conventionally, an imaging device which images an object that is hidden under people's clothes or the like and cannot be visually identified directly is known (see PTL 1, for example).

CITATION LIST

Patent Literature

PTL 1: U.S. Pat. No. 8,835,849

SUMMARY

Technical Problem

Conventionally, an imaging device that (i) includes: a point light source that emits electromagnetic waves that transmit through people's clothes or the like to a person; and a detector that receives reflected waves of the electromagnetic waves emitted from the point light source, and (ii) images an object hidden under the person's clothes or the like is known. In the use of such a conventional imaging device, electromagnetic waves that transmit through people's clothes or the like are specularly reflected by a human body, a metal, or the like. The conventional imaging device can therefore image only an area, of a human body, a metal, or the like that specularly reflects the electromagnetic waves emitted from the point light source, which is defined by an angle at which the reflected waves are incident on the detector. Accordingly, with the conventional imaging device, it is difficult to image, with high accuracy, the shape of a human body, a metal, or the like that is hidden under people's clothes or the like and cannot be visually identified directly.

In view of this, the present invention provides an imaging device capable of imaging more accurately, than the conventional imaging device, the shape of an object that is hidden under people's clothes or the like and cannot be visually identified directly.

Solution to Problem

An imaging device according to an aspect of the present disclosure includes: an area light source including an emission surface from which a sub-terahertz wave is emitted to a measurement target; and a detector including an image sensor that receives a reflected wave generated by the measurement target reflecting the sub-terahertz wave emitted from the emission surface. The area light source includes: at least one point light source that emits a sub-terahertz wave; and a reflector that reflects the sub-terahertz wave emitted from the at least one point light source, to generate a sub-terahertz wave to be emitted from the emission surface. The reflector has a reflection surface that is a bumpy surface which includes two or more frequency components in a spatial frequency range and whose roughness curve element mean length RSm is at least 0.3 mm. Note that the term "sub-terahertz wave" means an electromagnetic wave having a frequency that ranges from 0.08 THz to 1 THz, inclusive.

Advantageous Effects

With the imaging device according to an aspect of the present disclosure, it is possible to image more accurately, than a conventional imaging device, the shape of an object that is hidden under people's clothes or the like and cannot be visually identified directly.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS (How the Inventors Conceived an Aspect of the Present Disclosure)

The inventors have conducted a dedicated study on an imaging device which can perform imaging that enables detection of a hazardous object (e.g., a knife or the like) hidden, for instance, under people's clothes or the like, or in a bag.

Hereinafter, the study conducted by the inventors will be described.

The inventors have studied on the relationship between attenuation and frequency when electromagnetic waves transmit through a matter used as a material for clothes, bags, or the like.

Figure 1:
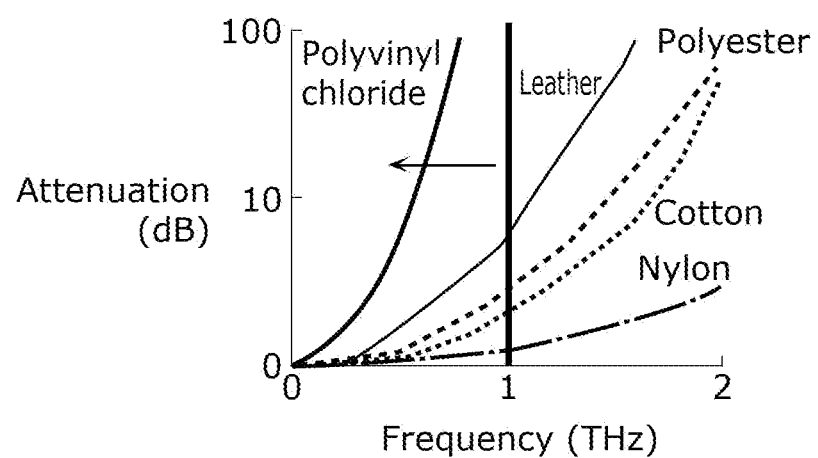
FIG. 1 is a diagram illustrating the relationship between attenuation and frequency when electromagnetic waves transmit through a matter.

FIG. 1 is a diagram illustrating the relationship between attenuation and frequency when electromagnetic waves transmit through a matter.

As illustrated in FIG. 1, electromagnetic waves having a frequency of at most 1 THz can transmit through many of matters used as materials for clothes, bags, or the like.

As a result of the study, the inventors have obtained the knowledge that it is appropriate to utilize electromagnetic waves having a frequency of at most 1 THz in order to detect a hazardous object hidden, for instance, under people's clothes or in a bag.

The inventors have also studied on a frequency that achieves resolution with which the shape of a hazardous object can be imaged.

The relationship between the frequency (wavelength) of electromagnetic waves and resolution is expressed by Equation 1 known as Abbe's formula.

[Math. 1]
$$\delta = \frac{\lambda}{2NA} = \frac{\lambda}{2n\sin\theta} \quad \text{Equation 1}$$

In Equation 1, δ denotes resolution, λ denotes the wavelength of electromagnetic waves, NA denotes the number of apertures of a lens, n denotes the refractive index of a medium between an object and the lens, and θ denotes a maximum angle with respect to the optical axis of a light beam incident on the lens from the object. When approximation is performed assuming d>> D where D denotes the entrance pupil diameter of an imaging lens and d denotes the distance from the entrance pupil position of the imaging lens to the object, Equation 2 is yielded.

[Math. 2]
$$\delta = \frac{\lambda}{n} * \frac{\sqrt{D^2 + d^2}}{D} \sim \frac{\lambda d}{nD} \quad \text{Equation 2}$$

Figure 2:
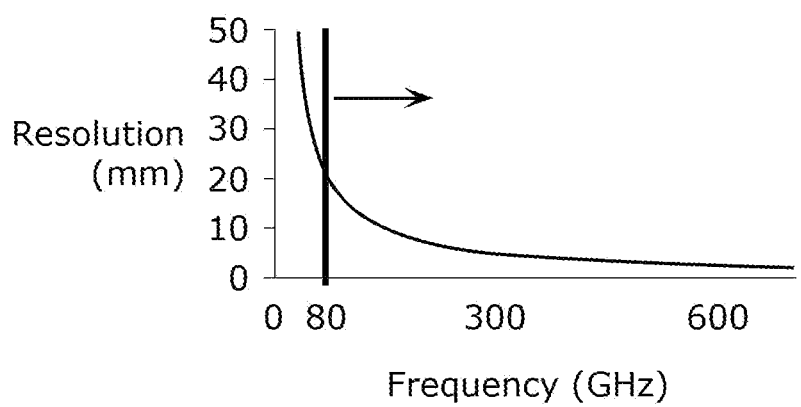
FIG. 2 is a diagram illustrating the relationship between the frequency of electromagnetic waves and resolution.

FIG. 2 is a diagram illustrating a graph into which Equation 2 is transformed under the conditions of D=0.5 m and d=2.5 m where n=1 assuming an air environment.

As illustrated in FIG. 2, it is possible to image the shape of a hazardous object such as a knife by utilizing electromagnetic waves having the frequency of at least 80 MHz (0.08 THz).

As a result of the study, the inventors have obtained knowledge that it is appropriate to utilize electromagnetic waves having the frequency of at least 0.08 THz in order to image the shape of a hazardous object such as a knife.

In other words, through these studies, the inventors have obtained knowledge that it is appropriate to utilize sub-terahertz waves that are electromagnetic waves having a frequency that ranges from 0.08 THz to 1 THz, inclusive, in order to perform imaging that enables the detection of a hazardous object hidden, for instance, under people's clothes or the like, or in a bag.

It is known that sub-terahertz waves do not affect human bodies. Therefore, utilizing sub-terahertz waves as electromagnetic waves to be emitted to a human body does not cause any problems in terms of safety.

On the other hand, sub-terahertz waves specularly reflect off a human body, a metal, or the like. Therefore, in imaging utilizing electromagnetic waves (sub-terahertz waves in this case) emitted from a point light source, it is difficult to image, with high accuracy, the shape of a human body, or a metallic hazardous object such as a knife, as has conventionally been the case. In order to solve this problem, the inventors have studied on the shape of a light source that emits sub-terahertz waves. As a result, the inventors have obtained the knowledge that if a light source that emits sub-terahertz waves is an area light source, it is possible to irradiate an object to be imaged with sub-terahertz waves from various angles, thereby enabling more accurate imaging, than that performed by a conventional imaging device, of the shape of an object such as a human body, a metal, or the like which specularly reflects sub-terahertz waves.

Based on all of the knowledge described above, the inventors have arrived at the following imaging device.

An imaging device according to an aspect of the present disclosure includes: an area light source including an emission surface from which a sub-terahertz wave is emitted to a measurement target; and a detector including an image sensor that receives a reflected wave generated by the measurement target reflecting the sub-terahertz wave emitted from the emission surface. The area light source includes: at least one point light source that emits a sub-terahertz wave; and a reflector that diffusely reflects the sub-terahertz wave emitted from the at least one point light source, to generate a sub-terahertz wave to be emitted from the emission surface, the reflector including a reflection surface that is a bumpy surface which includes two or more frequency components in a spatial frequency range and whose roughness curve element mean length RSm is at least 0.3 mm. The diffuse reflection here means that a ray of a sub-terahertz wave incident on the reflection surface at an angle of incidence when viewed at a macro level is reflected at multiple angles of reflection due to the structure of a bumpy surface having multiple bumps at a micro level.

The imaging device utilizes sub-terahertz waves emitted from an area light source, to perform imaging. With the imaging device, it is therefore possible to image more accurately, than a conventional imaging device, the shape of an object such as a human body, a metal, or the like that is hidden under people's clothes or the like and cannot be visually identified directly. In addition, roughness curve element mean length RSm of the reflection surface is at least the wavelength of sub-terahertz waves. According to the imaging device described above, the generation of interference fringes in sub-terahertz waves emitted from the emission surface would be suppressed even if sub-terahertz waves emitted from each of at least one point light source were coherent electromagnetic waves.

The detector may include an optical system that forms an image on the image sensor by an optical focus of the reflected wave. When $\phi$ denotes an entrance pupil diameter of the optical system, b denotes a distance between the emission surface and the measurement target, c denotes a distance between the measurement target and the optical system, and $\lambda$ denotes a wavelength of the sub-terahertz wave emitted from the at least one point light source: the reflection surface may include one or more unit areas each of which has a bumpy surface including at least two frequency components in a frequency range of at most $(\phi \times b/c)/\lambda$ in a spatial frequency range; a width of each of the one or more unit areas may be at least $\phi \times b/c$; and the roughness curve element mean length RSm may be less than $2 \times \phi \times b/c$.

The one or more unit areas may include a first unit area and a second unit area. The first unit area and the second unit area may be in contact with each other at a side shared between the first unit area and the second unit area. A geometry of a bumpy surface of the first unit area and a geometry of a bumpy surface of the second unit area may be line symmetric about the side serving as an axis of symmetry.

The detector may include an optical system that forms an image on the image sensor by an optical focus of the reflected wave. An angle θ1 that is a half width at half maximum of a strength of the sub-terahertz wave in the diffuse reflection by the reflector may be at least a value obtained using the following formula:

[Math. 3]

$$\tan^{-1}\left(\frac{a}{2b}\right)$$

where a denotes a width of an imaging range of the measurement target and b denotes a distance between the emission surface and the measurement target.

The detector may include an optical system that forms an image on the image sensor by an optical focus of the reflected wave. An angle θ2 that is a half width at half maximum in a distribution of inclination angles of bumps on the reflection surface may be at least a value obtained using the following formula:

[Math. 4]

$$\frac{1}{2} \times \tan^{-1}\left(\frac{a}{2b}\right)$$

where a denotes a width of an imaging range of the measurement target and b denotes a distance between the emission surface and the measurement target.

Hereinafter, specific examples of an imaging device according to an aspect of the present disclosure will be described with reference to the drawings. Each of embodiments described herein illustrates a specific example of the present disclosure. Note that the numerical values, shapes, elements, the arrangement and connection of elements, steps (processes), an order of the steps, etc. described in the following embodiments are mere examples, and do not intend to limit the present disclosure. Moreover, the figures are schematic diagrams and are not necessarily accurate illustrations. Hereinafter, the term "planar surface" refers not only to a surface that is accurately planar, but also to a surface that is substantially planar. In addition, the term "spheroid" refers not only to a surface that is accurately a spheroid, but also to a surface that is substantially a spheroid.

It should be noted that general or specific aspects of the present disclosure may be implemented using a system, method, integrated circuit, computer program, computer-readable recording medium such as a CD-ROM, or any given combination thereof.

Embodiment 1

The following describes an imaging device that emits sub-terahertz waves to a person, receives reflected waves generated by the person reflecting the sub-terahertz waves, and detects the intensity of the received reflected waves, to image a hazardous object such as a knife hidden by that person under his/her clothes or the like.

Figure 3:
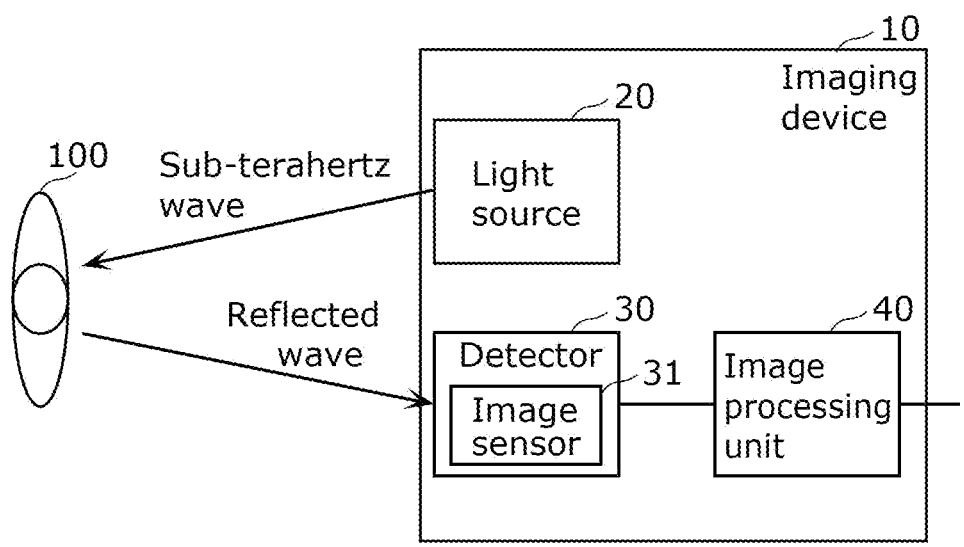
FIG. 3 is a block diagram illustrating a configuration of an imaging device according to Embodiment 1.

FIG. 3 is a block diagram illustrating a configuration of imaging device 10 according to Embodiment 1.

As illustrated in FIG. 3, imaging device 10 includes light source 20, detector 30, and image processing unit 40.

Light source 20 emits sub-terahertz waves to a measurement target (person 100 in this case).

Figure 4:
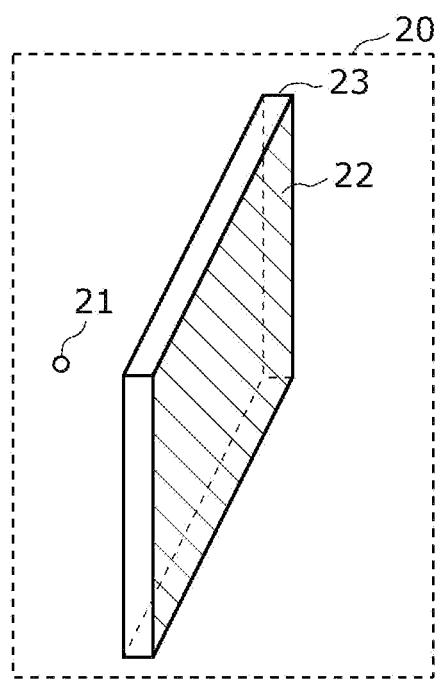
FIG. 4 is a schematic diagram illustrating a configuration of a light source according to Embodiment 1.

FIG. 4 is a schematic diagram illustrating a configuration of light source 20.

As illustrated in FIG. 4, light source 20 includes point light source 21 and optical element 23.

Point light source 21 emits sub-terahertz waves radially in all directions in the vicinity of point light source 21.

Optical element 23 has emission surface 22 and generates, from the sub-terahertz waves emitted from point light source 21, sub-terahertz waves to be emitted from emission surface 22. Emission surface 22 here is a planar surface. Therefore, optical element 23 functions as an area light source that emits sub-terahertz waves from emission surface 22 which is a planar surface. The emission surface from which sub-terahertz waves are emitted is a planar surface for the sake of explanation, but may be the inner surface of part of a spheroid to be described later, the inner surface of part of a sphere, or any curved surface.

Figure 5:
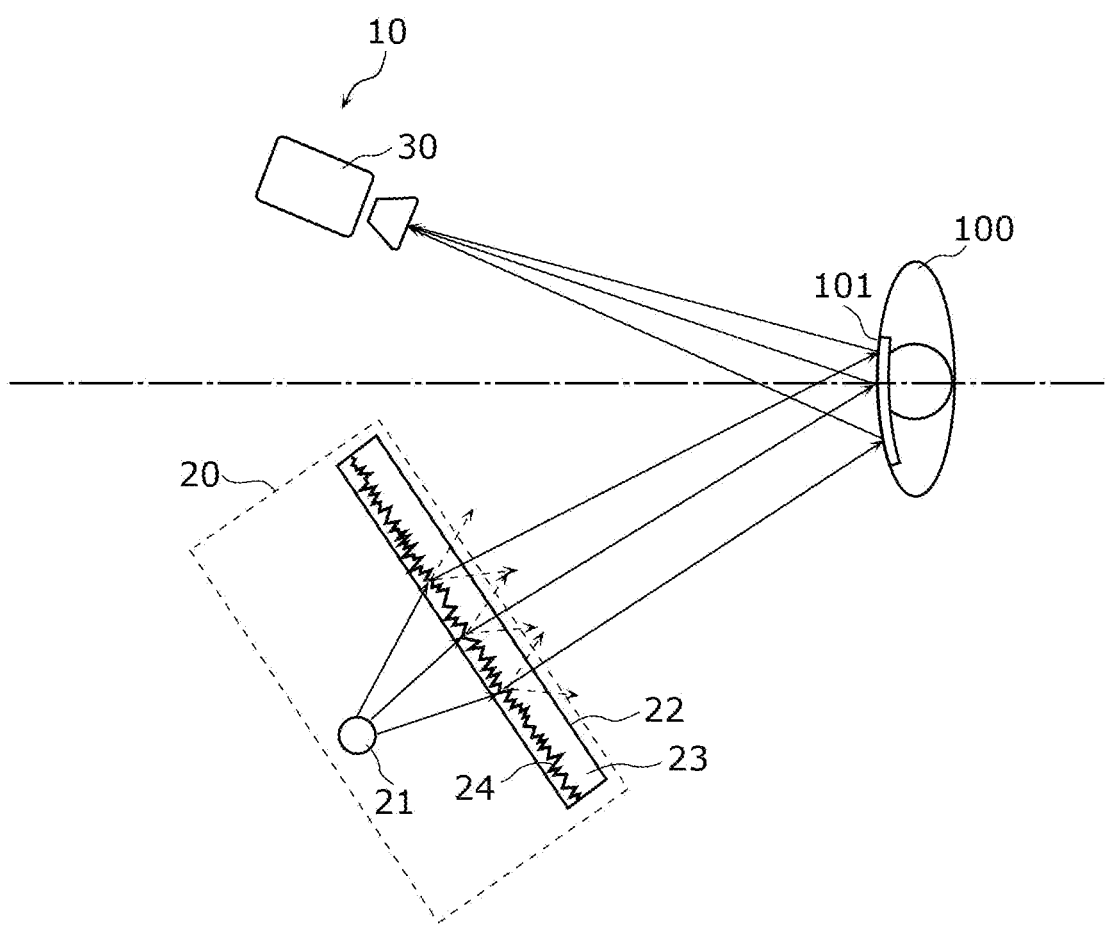
FIG. 5 is a schematic diagram illustrating a cross section showing how a detector according to Embodiment 1 receives reflected waves.

FIG. 5 is a schematic diagram illustrating a cross section showing how light source 20 functions as an area light source that emits sub-terahertz waves and how detector 30 to be described later receives reflected waves generated by a measurement target.

As illustrated in FIG. 5, optical element 23 includes diffuser 24 and has a principal surface on its front side as emission surface 22.

Diffuser 24 diffusely transmits the sub-terahertz waves emitted from point light source 21, to generate sub-terahertz waves to be emitted from emission surface 22. Diffuser 24 is a flat plate that is parallel to emission surface 22 when viewed from a macro perspective. When viewed from a micro perspective, on the other hand, tiny bumps are formed on the entire surface of diffuser 24 so that sub-terahertz waves diffuse when transmitting through diffuser 24.

In light source 20, point light source 21 is disposed at the rear side of optical element 23, as illustrated in FIG. 5. The sub-terahertz waves emitted from point light source 21 enter optical element 23 from the principal surface on the rear side of optical element 23 to reach diffuser 24. The sub-terahertz waves that have reached diffuser 24 diffusely transmit through diffuser 24. The sub-terahertz waves that have diffusely transmitted through diffuser 24 then propagate to emission surface 22 and are emitted outward from emission surface 22.

Referring back to FIG. 3, the description of imaging device 10 continues.

Detector 30 includes image sensor 31.

Image sensor 31 transforms an image generated by sub-terahertz waves emitted from a subject into an electric signal that is in accordance with the intensity of the sub-terahertz waves. Image sensor 31 then generates an image that is based on the electric signal into which the sub-terahertz waves are transformed. Hereinafter, generating, by image sensor 31, an image including an image of a subject is also referred to as "imaging". When sub-terahertz waves emitted from light source 20 are reflected by a measurement target (person 100 in this case) which is a subject and the reflected waves reach image sensor 31, image sensor 31 receives the reflected waves.

As described above, sub-terahertz waves specularly reflect off a human body, a metal, or the like. Therefore, image sensor 31 receives reflected waves from an area, of the body of person 100 and the knife hidden by person 100, which is defined by an angle at which reflected waves resulting from the specular reflection are incident on image sensor 31.

As described above, light source 20 functions as an area light source that emits sub-terahertz waves from emission surface 22. Therefore, light source 20 can irradiate person 100 with sub-terahertz waves from various angles. Image sensor 31 can thus receive reflected waves from area 101 that is a relatively wide range of the surfaces of person 100, i.e., the body of person 100, and a knife hidden by person 100. Accordingly, imaging device 10 is capable of imaging area 101 that is a relatively wide range of the surfaces of the body of person 100 and the knife hidden by person 100.

Figure 6:
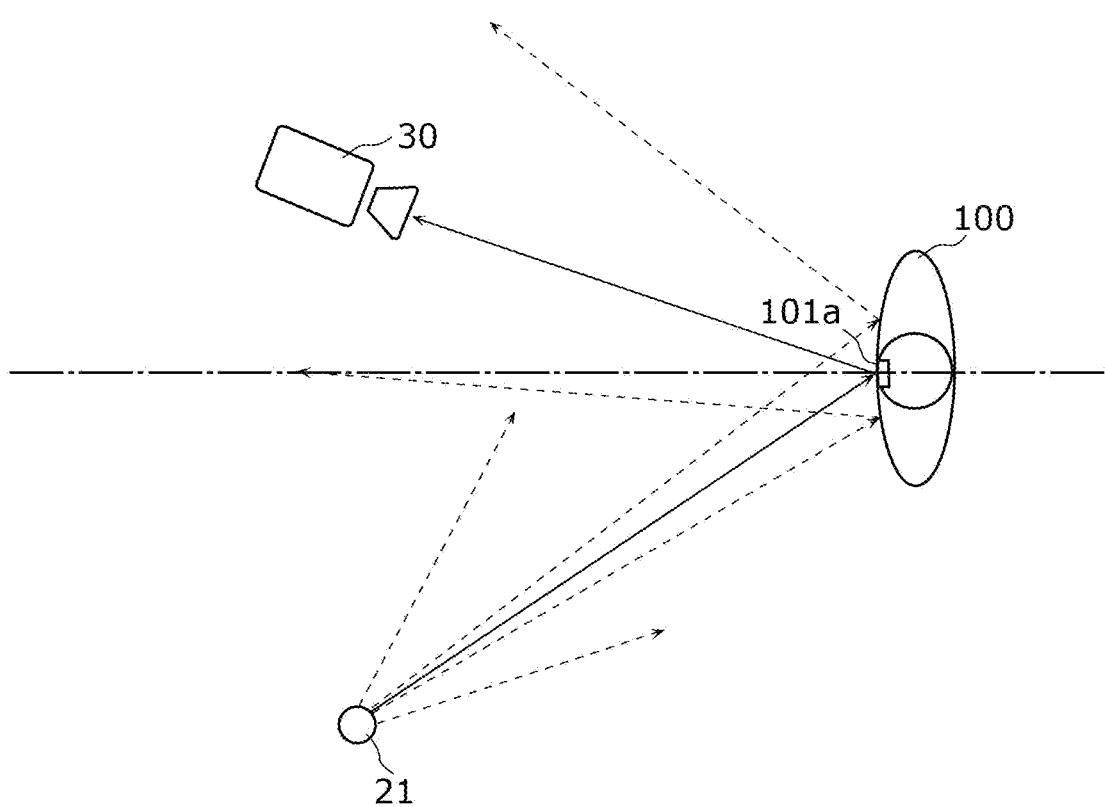
FIG. 6 is a schematic diagram illustrating a cross section showing how a detector according to a first comparative example receives reflected waves.

FIG. 6 is a schematic diagram illustrating a cross section showing how detector 30 receives reflected waves in an imaging device according to a first comparative example, from which optical element 23 has been removed, that is, an imaging device configured to emit sub-terahertz waves emitted outward from point light source 21, as-is.

With the imaging device according to the first comparative example, image sensor 31 can receive only reflected waves from area 101a, of the surfaces of the body of person 100 and the knife hidden by person 100, which is defined by an angle at which reflected waves resulting from specular reflection are incident on image sensor 31, as illustrated in FIG. 6. Accordingly, the imaging device according to the first comparative example can image only area 101a that is a relatively narrow area of the surfaces of the body of person 100 and the knife hidden by person 100.

Thus, imaging device 10 according to Embodiment 1 is capable of more accurately imaging the shapes of the body of person 100 and the knife hidden by person 100, compared to the imaging device according to the first comparative example.

Referring back to FIG. 3, the description of imaging device 10 continues. Detector 30 outputs an image generated by image sensor 31 to image processing unit 40.

Upon receiving the image from detector 30, image processing unit 40 outputs the received image to an external device and also performs image processing on the received image and outputs the result of the image processing to the external device.

The image processing performed by image processing unit 40 may be, for example, a process of determining whether an image outputted from detector 30 includes an object having predetermined characteristics (e.g., an object having the characteristics of a knife) and outputting a predetermined detection signal (e.g., an alarm indicating that an object having the characteristics of a knife is imaged) when it is determined that the image includes an object having the predetermined characteristics. Image processing unit 40 may include, for example, a processor and memory, and perform the process by the processor executing a program stored in the memory.

Imaging device 10 having the above configuration is installed, for example, in a pathway at an airport, in the vicinity of an exit of a station, or the like.

Figure 7:
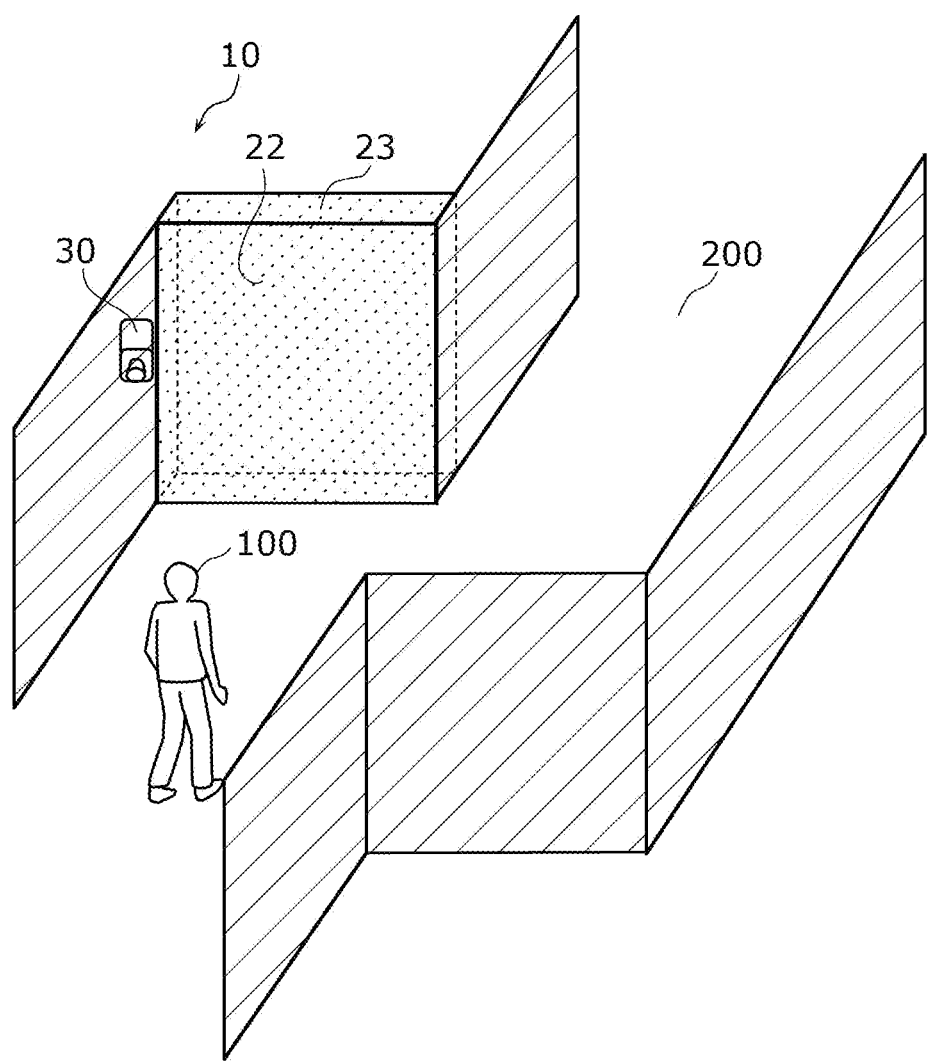
FIG. 7 is a schematic diagram illustrating how the imaging device according to Embodiment 1 is installed.

FIG. 7 is a schematic diagram illustrating how imaging device 10 is installed in a pathway at an airport.

Imaging device 10 may be installed in such a manner, for example, that optical element 23 and detector 30 are embedded inside a wall along pathway 200 that is in a crank shape at an airport, as illustrated in FIG. 7.

In FIG. 7, sub-terahertz waves emitted from emission surface 22 inside the wall transmit through the wall and person 100 is irradiated with the sub-terahertz waves. Then, reflected waves generated by person 100 reflecting the sub-terahertz waves transmit through the wall again to be incident on detector 30. This enables imaging device 10 to image a hazardous object such as a knife hidden under the clothes or the like of person 100 walking along pathway 200.

Embodiment 2

The following describes an imaging device according to Embodiment 2 which has a configuration obtained by partly modifying the configuration of imaging device 10 according to Embodiment 1. Hereinafter, the imaging device according to Embodiment 2 will be described mainly focusing on the difference between the imaging device according to Embodiment 2 and imaging device 10.

Figure 8:
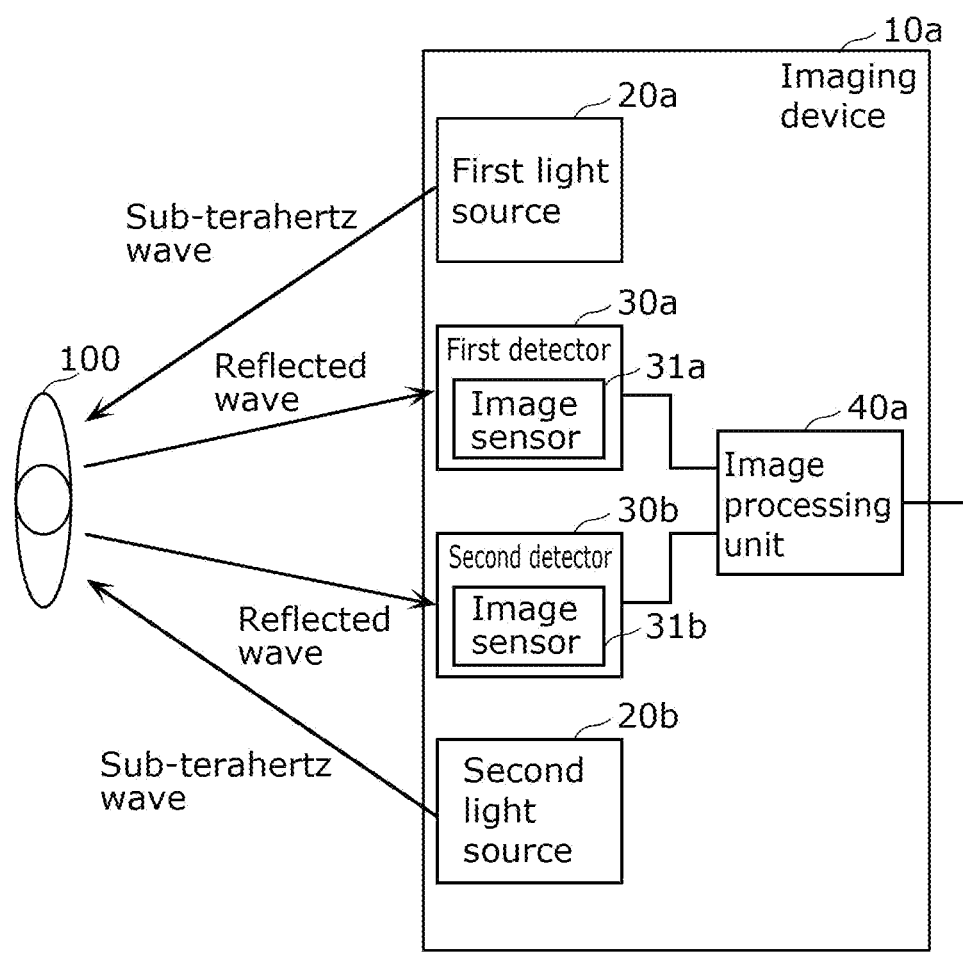
FIG. 8 is a block diagram illustrating a configuration of an imaging device according to Embodiment 2.

FIG. 8 is a block diagram illustrating a configuration of imaging device 10a according to Embodiment 2.

As illustrated in FIG. 8, imaging device 10a includes first light source 20a and second light source 20b as modified from light source 20 of imaging device 10 according to Embodiment 1, first detector 30a and second detector 30b as modified from detector 30 of imaging device 10, and image processing unit 40a as modified from image processing unit 40 of imaging device 10.

First light source 20a emits sub-terahertz waves to a measurement target (person 100 in this case).

Figure 9:
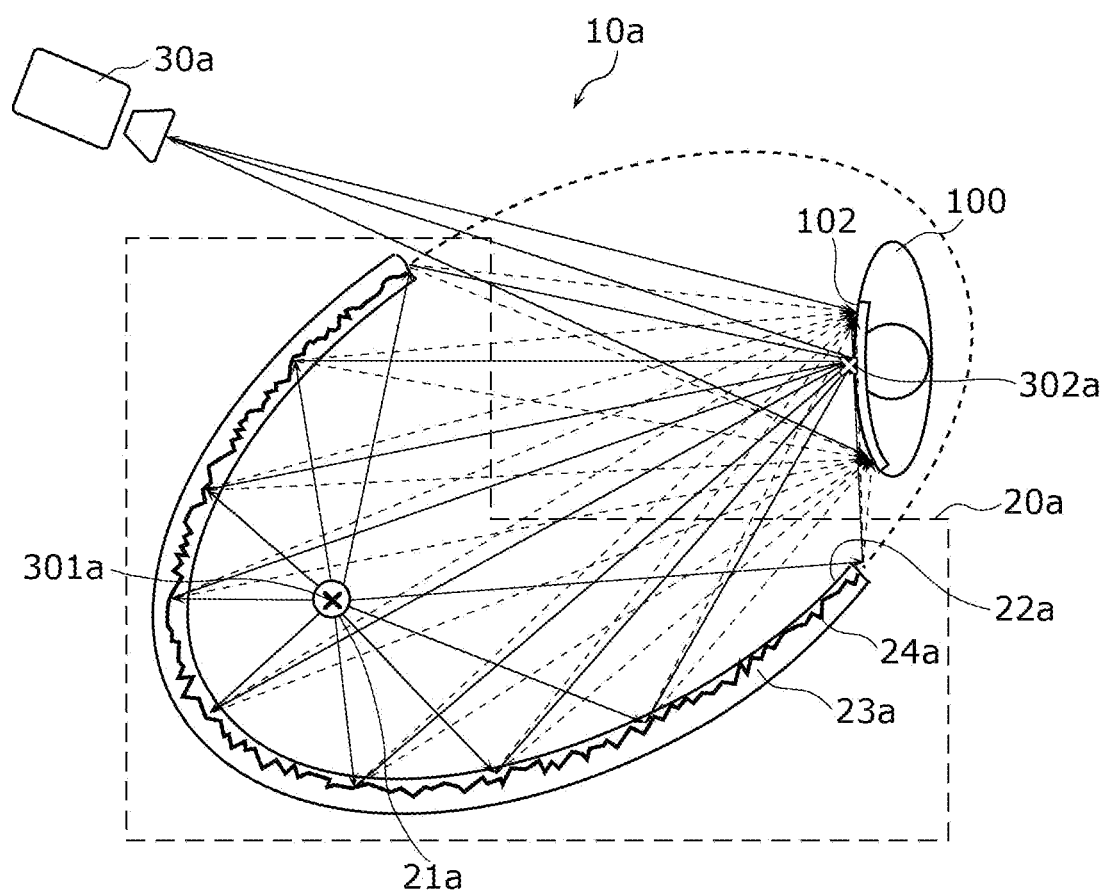
FIG. 9 is a schematic diagram illustrating a cross section showing how a first detector according to Embodiment 2 receives reflected waves.

FIG. 9 is a schematic diagram illustrating a configuration of first light source 20a as well as a cross section showing how first light source 20a functions as an area light source and how first detector 30a to be described later receives reflected waves.

As illustrated in FIG. 9, first light source 20a includes point light source 21a and optical element 23a.

Point light source 21a emits sub-terahertz waves radially in all directions in the vicinity of point light source 21a.

Optical element 23a has first emission surface 22a and generates, from the sub-terahertz waves emitted from point light source 21a, sub-terahertz waves to be emitted from first emission surface 22a. First emission surface 22a here is the inner surface of a spheroid. Therefore, optical element 23a functions as an area light source that emits sub-terahertz waves from first emission surface 22a which is the inner surface of a spheroid.

As illustrated in FIG. 9, optical element 23a includes reflector 24a and has first emission surface 22a as the inner curved surface of reflector 24a.

Reflector 24a diffusely reflects sub-terahertz waves emitted from point light source 21a to generate sub-terahertz waves to be emitted from first emission surface 22a. When viewed from a macro perspective, reflector 24a has the same or larger size but is similar in shape compared to first emission surface 22a, and two focal points of reflector 24 match two focal points of first emission surface 22a. When viewed from a micro perspective, on the other hand, tiny bumps are formed on the entire surface of the reflection surface of reflector 24a so that the reflected sub-terahertz waves diffuse.

In first light source 20a, point light source 21a is disposed at one focal point 301a of the two focal points of first emission surface 22a, as illustrated in FIG. 9. The sub-terahertz waves emitted from point light source 21a enter optical element 23a from first emission surface 22a and reaches reflector 24a. The sub-terahertz waves that have reached reflector 24a are diffusely reflected by reflector 24a. The sub-terahertz waves that have diffusely reflected by reflector 24a are then transmitted to first emission surface 22a and emitted outward from first emission surface 22a. For example, person 100 in the vicinity of other focal point 302a of the two focal points of first emission surface 22a is irradiated with the sub-terahertz waves emitted outward.

Although it is described herein that first emission surface 22a and reflector 24a are separate components, first emission surface 22a and reflector 24a do not necessarily need to be limited to such an example of being separate components. For example, first emission surface 22a may be the reflection surface of reflector 24a.

Second light source 20b in FIG. 8 has the same function as that of first light source 20a, and has a shape that is in a mirrored relationship with the shape of first light source 20a. Therefore, second light source 20b can be explained by replacing point light source 21a with point light source 21b, optical element 23a with optical element 23b, reflector 24a with reflector 24b, one focal point 301a with one focal point 301b, and other focal point 302a with other focal point 302b in the description of first light source 20a, while keeping the description on the shape of second light source 20b unchanged.

Referring back to FIG. 8, the description of imaging device 10a continues.

First detector 30a includes first image sensor 31a. First detector 30a is the same as detector 30 according to Embodiment 1. In other words, first image sensor 31a is the same as image sensor 31 according to Embodiment 1.

Second detector 30b is the same as first detector 30a. Therefore, second detector 30b can be explained by reading first image sensor 31a as second image sensor 31b in the description of first detector 30a.

As described above, first light source 20a functions as an area light source that emits sub-terahertz waves from first emission surface 22a. First light source 20a is therefore capable of irradiating person 100 in the vicinity of other focal point 302a with sub-terahertz waves from various angles. First image sensor 31a can thus receive reflected waves from area 102 that is a relatively wide range of the surfaces of person 100, that is, the body of person 100 and a knife hidden by person 100. Accordingly, imaging device 10a is capable of imaging area 102 that is a relatively wide range of the surfaces of the body of person 100 and the knife hidden by person 100.

Figure 10:
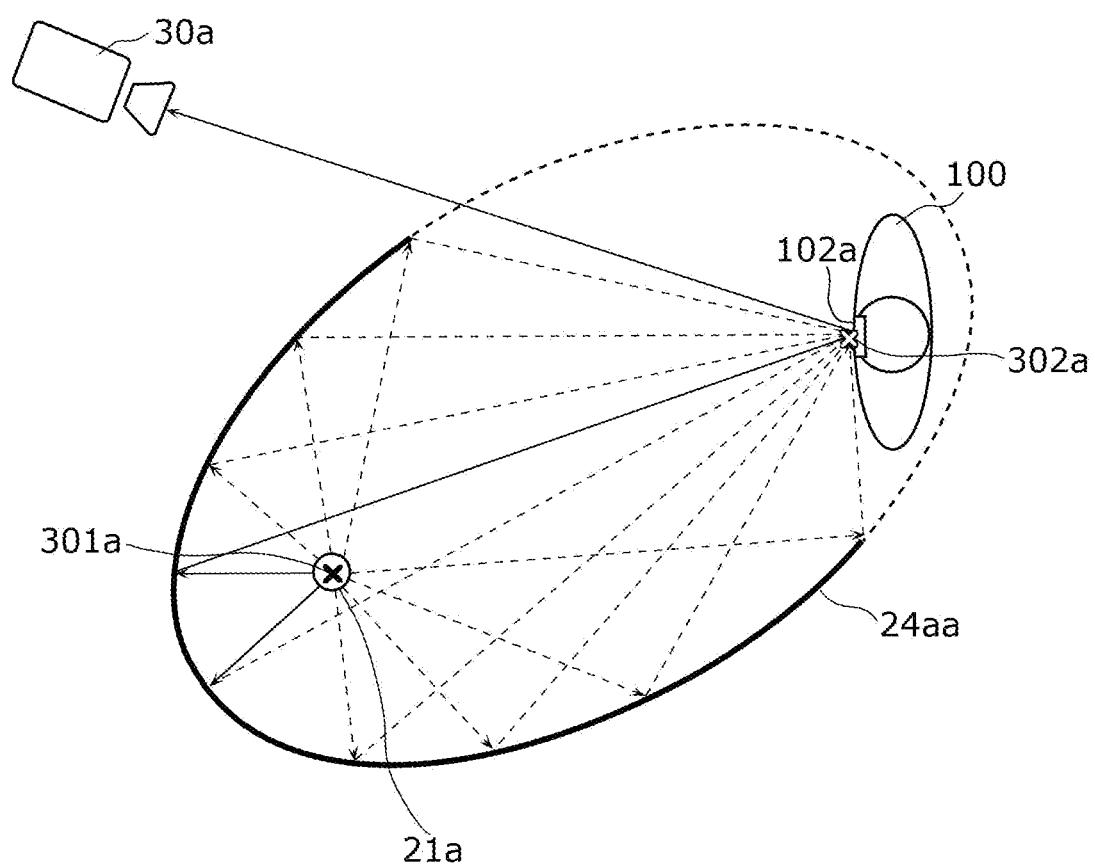
FIG. 10 is a schematic diagram illustrating a cross section showing how a detector according to a second comparative example receives reflected waves.

FIG. 10 is a schematic diagram illustrating a cross section showing how first detector 30a receives reflected waves in an imaging device according to a second comparative example which has a configuration in which reflector 24a of imaging device 10a is modified to reflector 24aa. When viewed from a macro perspective, reflector 24aa here has the same shape as reflector 24a, but when viewed from a micro perspective, the entire surface of the reflection surface of reflector 24aa is smoothly formed so that reflected sub-terahertz waves specularly reflect off the reflection surface. Therefore, sub-terahertz waves emitted from one focal point 301a and reflected by reflector 24aa all travel toward other focal point 302a no matter which portion of reflector 24aa the reflected sub-terahertz waves have been reflected. Therefore, in the imaging device according to the second comparative example, image sensor 31a can receive only reflected waves from area 102a, which is located at other focal point 302a, of the surfaces of the body of person 100 in the vicinity of other focal point 302a and the knife hidden under the clothes of person 100, as illustrated in FIG. 10. Accordingly, the imaging device according to the second comparative example can image only area 102a that is a relatively narrow area of the surfaces of the body of person 100 and the knife hidden by person 100.

Thus, imaging device 10a according to Embodiment 2 is capable of more accurately imaging the shapes of the body of person 100 and the knife hidden by person 100, as compared to the imaging device according to the second comparative example.

Referring back to FIG. 8, the description of imaging device 10a continues.

First detector 30a and second detector 30b respectively output a first image and a second image respectively generated by first image sensor 31a and second image sensor 31b to image processing unit 40a.

Upon receiving the first image and the second image from first detector 30a and second detector 30b, respectively, image processing unit 40a outputs the received first image and second image to an external device, and also performs image processing on the received first image and second image and outputs the result of the image processing to the external device.

The image processing performed by image processing unit 40a may be, for example, determining whether the first image and the second image respectively outputted from first detector 30a and second detector 30b each include an object having predetermined characteristics (e.g., an object having the characteristics of a knife), and outputting a predetermined detection signal (e.g., an alarm indicating that an object having the characteristics of a knife is imaged) when it is determined that at least one of the first image or the second image includes an object having predetermined characteristics. The image processing performed by image processing unit 40a may also include a process of: blending the first image and the second image in a lighten only mode to generate a blended image in the case where it is determined that at least one of the first image or the second image includes an object having the predetermined characteristics; determining whether the blended image includes an object having the predetermined characteristics; and in the case where it is determined that the blended image includes an object having the predetermined characteristics, outputting a predetermined detection signal. Image processing unit 40a may include, for example, a processor and memory, and perform the process by the processor executing a program stored in the memory.

Imaging device 10a having the above configuration is installed, for example, in a pathway at an airport or in the vicinity of an exit of a station.

Figure 11:
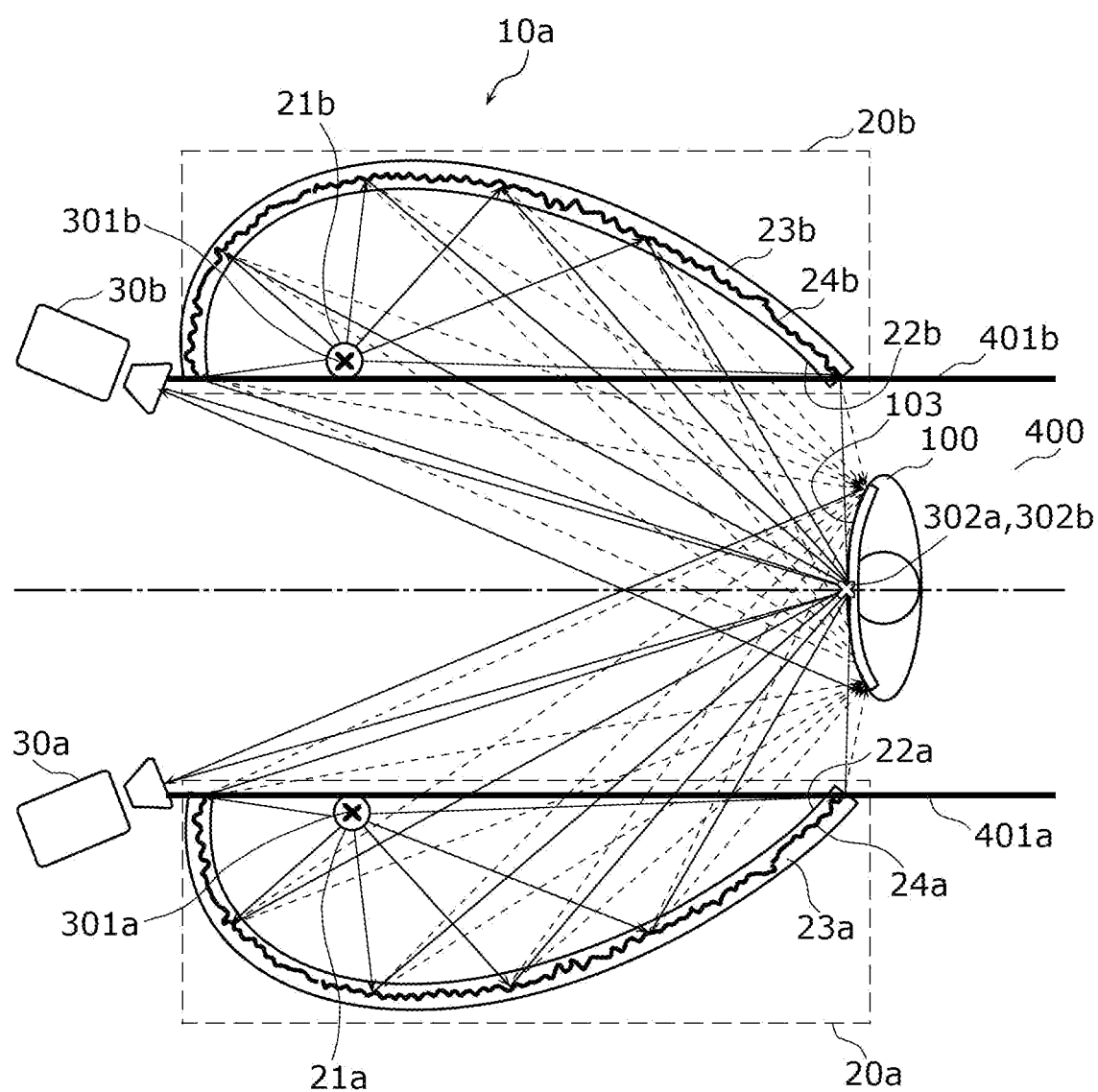
FIG. 11 is a schematic diagram illustrating a cross section showing how the imaging device according to Embodiment 2 is installed.

FIG. 11 is a schematic diagram illustrating a cross section showing how imaging device 10a is installed in a pathway in the vicinity of an exit of a station.

Imaging device 10a may be installed in such a manner, for example, that optical element 23a and optical element 23b are embedded inside walls along pathway 400 in the vicinity of an exit of a station, as illustrated in FIG. 11. More specifically, imaging device 10a may be installed in such a manner, for example, that optical element 23a is embedded inside wall 401a that is one of the side walls along pathway 400 and optical element 23b is embedded inside wall 401b that is the other of the side walls along pathway 400. Thus, imaging device 10a may be installed in such a manner that first light source 20a and second light source 20b are provided on opposite sides of pathway 400 and first detector 30a and second detector 30b are also provided on opposite sides of pathway 400. Accordingly, first detector 30a detects, using first image sensor 31a, the intensities of reflected waves generated by a measurement target (person 100 in this case) positioned in pathway 400 reflecting sub-terahertz waves emitted from first emission surface 22a and sub-terahertz waves emitted from second emission surface 22b, whereas second detector 30b detects, using second image sensor 31b, the intensities of reflected waves generated by a measurement target (person 100 in this case) positioned in pathway 400 reflecting sub-terahertz waves emitted from first emission surface 22a and sub-terahertz waves emitted from second emission surface 22b. In this case, it is desirable that optical element 23a and optical element 23b be installed so that other focal point 302a of optical element 23a substantially coincides with other focal point 302b of optical element 23b on the center line of pathway 400. By thus placing optical elements 23a and 23b, it is possible to irradiate an area in the vicinity of other focal point 302a or other focal point 302b (hereinafter referred to as "focal area") with sub-terahertz waves emitted from point light source 21a and sub-terahertz waves emitted from point light source 21b from various angles. Therefore, first image sensor 31a and second image sensor 31b respectively included in first detector 30a and second detector 30b can receive reflected waves from area 103 that is a relatively wide range of the surface of person 100 walking in the focal area, that is, the body of person 100 walking in a focal area and the surface of the knife hidden by person 100, as illustrated in FIG. 11. Accordingly, imaging device 10a is capable of imaging area 103 that is a relatively wide range of the surfaces of the body of person 100 and the knife hidden by person 100. Moreover, first image sensor 31a and second image sensor 31b respectively included in first detector 30a and second detector 30b receive reflected waves from mutually different angles from area 103. Accordingly, imaging device 10a is capable of imaging the body of person 100 and the knife hidden by person 100, which are the same subject, from mutually different angles.

Hereinafter, an operation performed by imaging device 10a having the above configuration will be described.

As one example, imaging device 10a performs an image analysis process. The image analysis process is a process in which imaging device 10a images a first image and a second image and outputs, based on the imaged first image and second image, a detection signal which is an alarm indicating that an object having the characteristics of a knife is being imaged.

Figure 12:
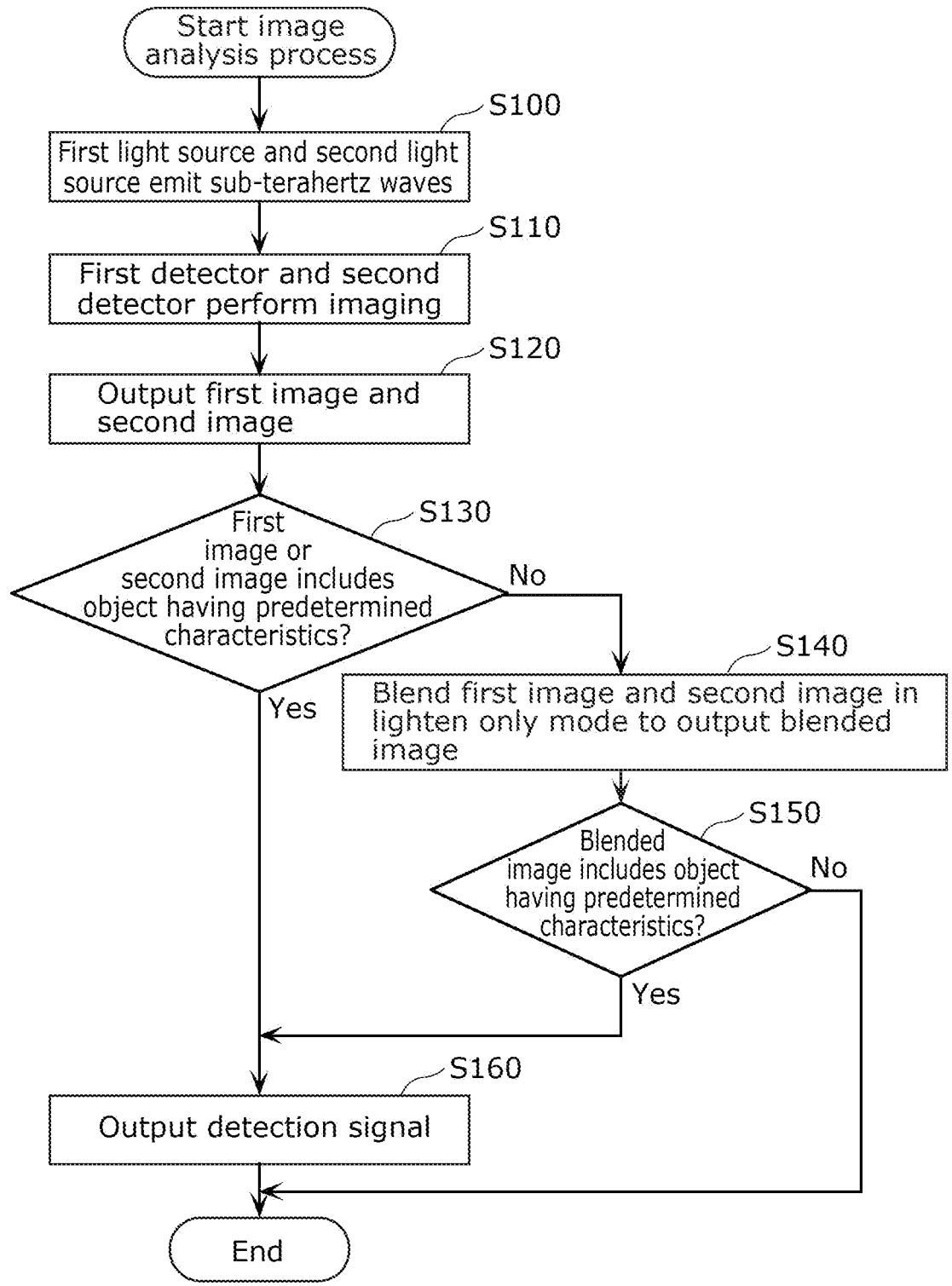
FIG. 12 is a flowchart illustrating an image analysis process.

FIG. 12 is a flowchart illustrating the image analysis process performed by imaging device 10a.

The image analysis process is started when a person enters a focal area.

When a person enters a focal area, imaging device 10a detects that the person has entered the focal area. Imaging device 10a may detect that a person has entered the focal area, for example, by receiving a signal indicating that the person has entered the focal area from an external sensor that detects a person entering the focal area.

When it is detected that the person has entered the focal area, first light source 20a and second light source 20b emit sub-terahertz waves at the same timing in synchronization with each other (step S100). Moreover, first detector 30a and second detector 30b image the person having entered the focal area at the timing when first light source 20a and second light source 20b emit the sub-terahertz waves in synchronization with each other (step S110). First detector 30a and second detector 30b then respectively output a first image and a second image to image processing unit 40a.

When the first image and the second image are output, image processing unit 40a receives the first image and the second image that have been output and outputs the received first image and second image to an external device (step S120). Image processing unit 40a then determines whether at least one of the first image or the second image includes an object having the characteristics of a knife which are predetermined characteristics (step S130).

In the process of step S130, in the case of not determining that at least one of the first image or the second image includes an object having the predetermined characteristics (step S130: No), image processing unit 40a blends the first image and the second image in a lighten only mode to generate a blended image, and outputs the generated blended image (step S140). Image processing unit 40a then determines whether the generated blended image includes an object having the characteristics of a knife which are the predetermined characteristics (step S150).

In the case of determining that at least one of the first image or the second image includes an object having the predetermined characteristics (step S130: Yes) in the process of step S130 and also in the case of determining that the blended image includes an object having the predetermined characteristics (step S150: Yes) in the process of step S150, image processing unit 40a outputs, to an external device, a detection signal which is an alarm indicating that an object having the characteristics of a knife is being imaged (step S160).

Imaging device 10a ends the image analysis process when the process of step S160 ends or in the case of not determining that the blended image includes an object including the predetermined characteristics (step S150: No) in the process of step S150.

Embodiment 3

An imaging device according to Embodiment 3 resulting from modifying part of the configuration of imaging device 10a according to Embodiment 2 will be described. Hereinafter, the imaging device according to Embodiment 3 will be described focusing on the difference from imaging device 10a.

Figure 13:
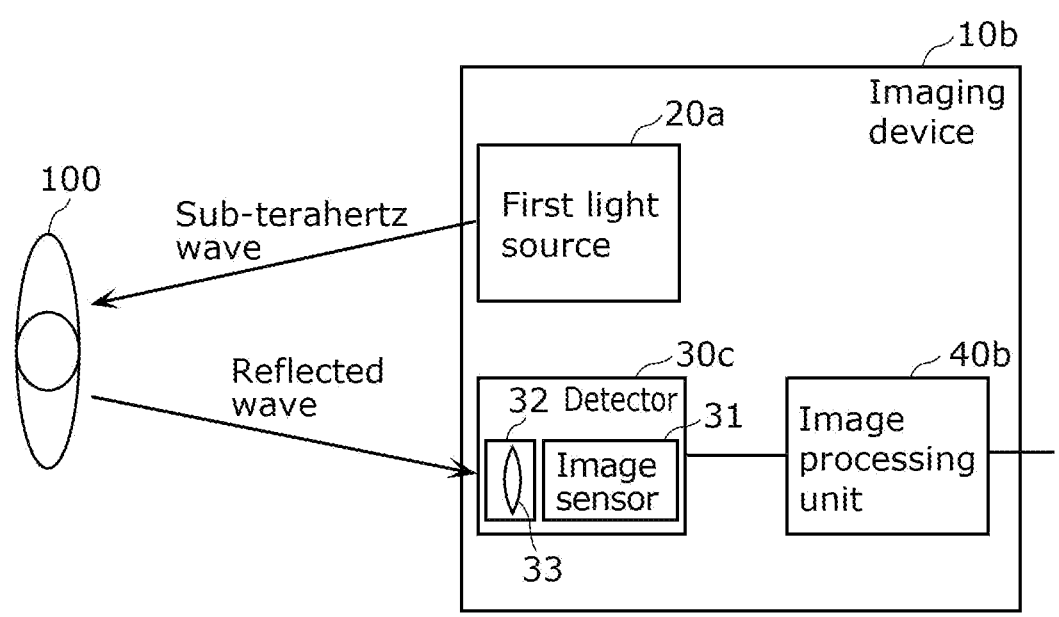
FIG. 13 is a block diagram illustrating the configuration of an imaging device according to Embodiment 3.

FIG. 13 is a block diagram illustrating the configuration of imaging device 10b according to Embodiment 3.

As illustrated in FIG. 13, imaging device 10b is configured as a result of removing second light source 20b and second detector 30b from imaging device 10a according to Embodiment 2, and replacing first detector 30a with detector 30c and image processing unit 40a with image processing unit 40b.

Detector 30c includes image sensor 31 and optical system 32.

Optical system 32 forms an image by the optical focus of reflected waves generated by a measurement target (person 100 in this case) reflecting sub-terahertz waves emitted from first emission surface 22a. Optical system 32 includes at least one lens including lens 33. $\phi$ denotes the entrance pupil diameter of optical system 32.

Detector 30c outputs an image generated by image sensor 31 to image processing unit 40b.

Upon receiving the image from detector 30c, image processing unit 40b outputs the received image to an external device as well as performs image processing on the received image and outputs the result of the image processing to the external device. The image processing performed by image processing unit 40b is the same processing as the image processing performed by image processing unit 40 according to Embodiment 1.

As described in Embodiment 2, when reflector 24a constituting first light source 20a is viewed from a micro perspective, tiny bumps are formed on the entire surface of the reflection surface of reflector 24a to diffusely reflect sub-terahertz waves emitted from point light source 21a. The structure of the reflection surface of reflector 24a will be described in more detail.

In order to achieve the diffuse reflection described above, the reflection surface of reflector 24a has a bumpy surface whose roughness curve element mean length RSm is at least 0.3 mm.

The wavelength of sub-terahertz waves emitted from point light source 21a is at most 0.3 mm. Accordingly, the sub-terahertz waves emitted from point light source 21a are diffusely reflected when irradiated on the reflection surface that is a bumpy surface whose roughness curve element mean length RSm is at least 0.3 mm. Thus, owing to the reflection surface of reflector 24a being a bumpy surface whose roughness curve element mean length RSm is at least the wavelength of sub-terahertz waves, the diffuse reflection of the sub-terahertz waves emitted from point light source 21a is achieved.

Figure 14:
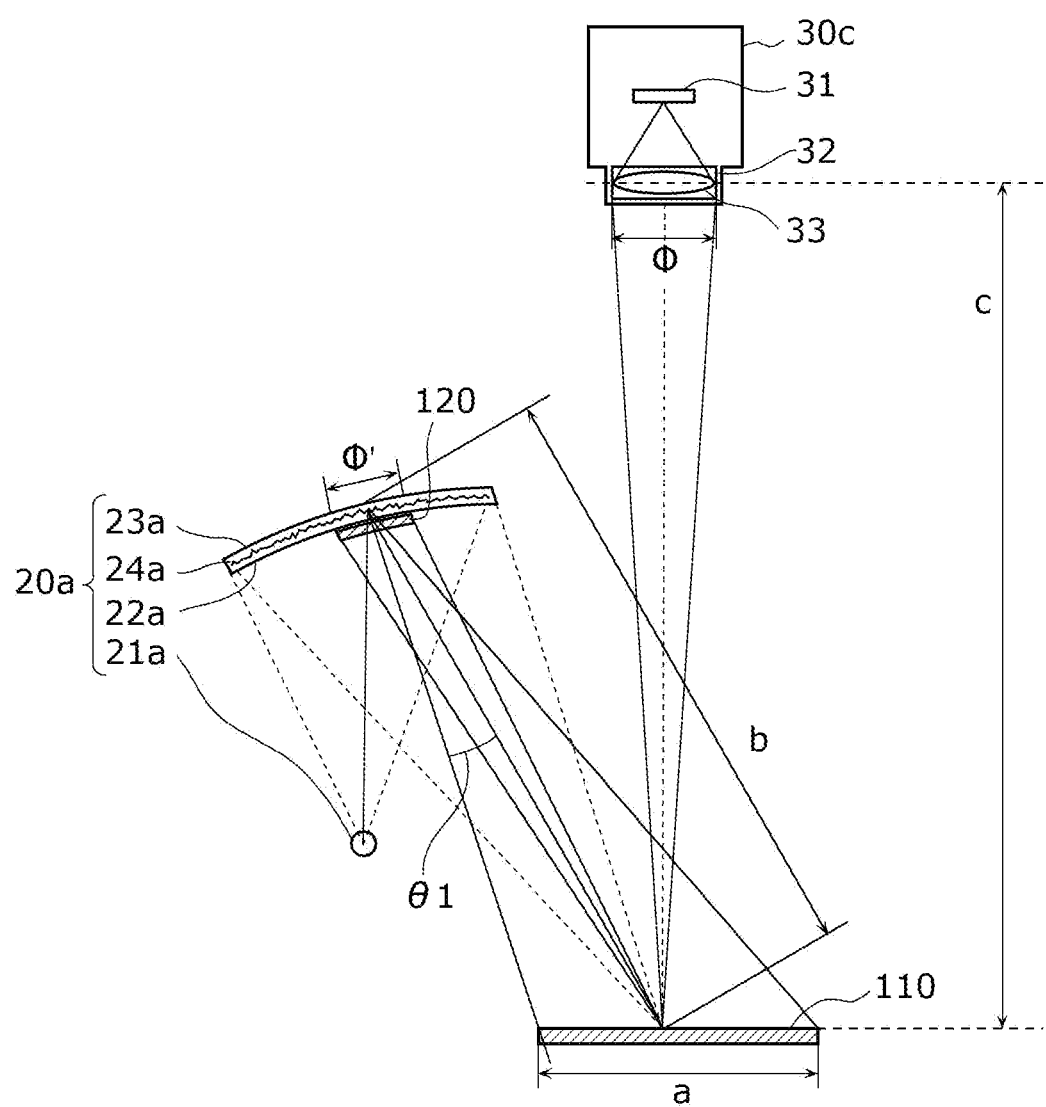
FIG. 14 is a schematic diagram illustrating how the imaging device according to Embodiment 3 images a measurement target.

FIG. 14 is a schematic diagram illustrating how imaging device 10b images a measurement target.

In FIG. 14, imaging range 110 is an area to be subjected to imaging by imaging device 10b out of the surface of the measurement target. As described in Embodiment 2, imaging range 110 is an area in the vicinity of other focal point 302a (see, for example, FIG. 9) out of the two focal points of first emission surface 22a. On the other hand, point light source 21a is located at one focal point 301a (see, for example, FIG. 9) out of the two focal points of first emission surface 22a.

Imaging sub-terahertz wave emission area 120 is an area that is a portion of first emission surface 22a, and is an area from which sub-terahertz waves, which are the origin of reflected light components that form an image on image sensor 31, are emitted out of reflected light reflected by the measurement target.

Distance b is the distance between first emission surface 22a and the measurement target. More specifically, distance b is the distance between imaging sub-terahertz wave emission area 120 and imaging range 110.

Distance c is the distance between the measurement target and optical system 32. More specifically, distance c is the distance between imaging range 110 and optical system 32.

Width $\phi$ of imaging sub-terahertz wave emission area 120 is determined, using Equation 3 indicated below, based on the positional relationship among first emission surface 22a, the measurement target, and optical system 32.

[Math. 5]

$$\phi' = \phi \times b/c \qquad \text{Equation 3}$$

When a periodic structure is present on the reflection surface of reflector 24a in imaging sub-terahertz wave emission area 120, interference fringes may occur in the reflected light by the focus of which an image is formed on image sensor 31.

Figure 15A:
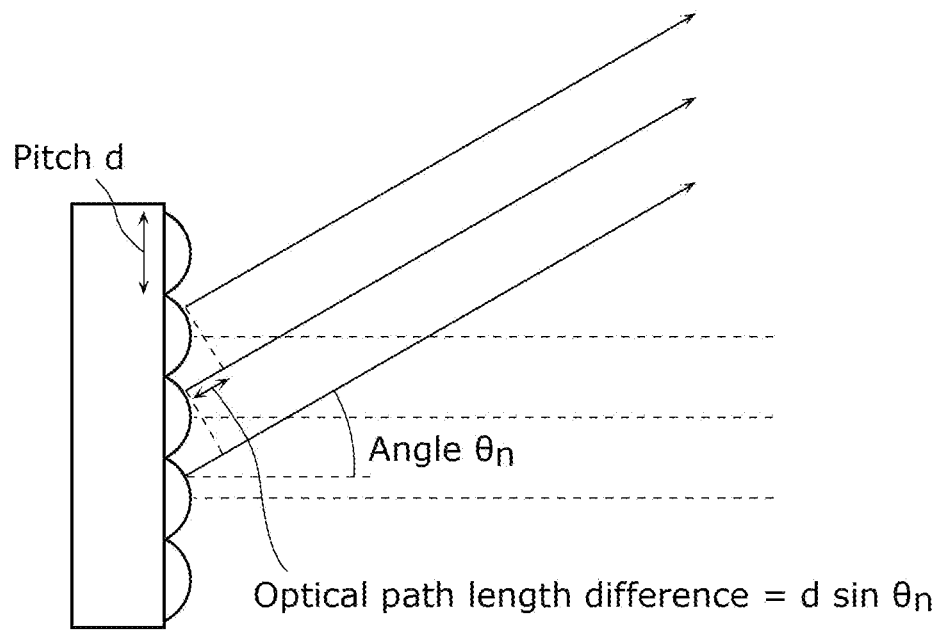
FIG. 15A is a schematic diagram illustrating how the reflection surface of a reflector according to a comparative example reflects sub-terahertz waves.

FIG. 15A is a schematic diagram illustrating how the reflection surface of a reflector according to a comparative example reflects sub-terahertz waves.

As illustrated in FIG. 15A, an emission surface according to the comparative example has a periodic structure composed of pitches d.

In the case where the reflection surface of the reflector according to the comparative example has such a periodic structure composed of pitches d, when coherent sub-terahertz waves are reflected by the reflection surface, interference fringes in which bright lines are formed at the location of angle $\theta_n$ determined by the following Equation 4 occur in the reflected waves.

[Math. 6]

$$\theta_n = \sin^{-1}\left(\frac{n\lambda}{d}\right) (n \text{ is an integer of 1 or greater}) \qquad \text{Equation 4}$$

Figure 15B:
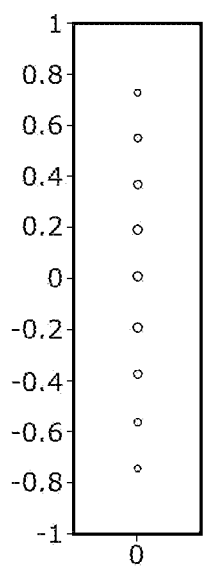
FIG. 15B is a schematic diagram illustrating how sub-terahertz waves reflected by the reflection surface of the reflector according to the comparative example generates interference fringes.

FIG. 15B is a schematic diagram illustrating how the sub-terahertz waves reflected by the reflection surface of the reflector according to the comparative example generate interference fringes.

Assuming that the reflection surface of reflector 24a in imaging sub-terahertz wave emission area 120 has a periodic structure composed of only one frequency component of $\phi'/d$ in a spatial frequency range, if sub-terahertz waves emitted from point light source 21a are coherent sub-terahertz waves, an image formed on image sensor 31 receives a relatively large influence from interference fringes.

This is why the actual reflection surface of reflector 24a is a bumpy surface including at least two frequency components in the frequency range of at most ϕ'/λ in the spatial frequency range when λ denotes the wavelength of sub-terahertz waves emitted from point light source 21a.

This would reduce the influence of interference fringes on the image of the measurement target formed on image sensor 31 even if the sub-terahertz waves emitted from point light source 21a were coherent sub-terahertz waves.

Figure 15C:
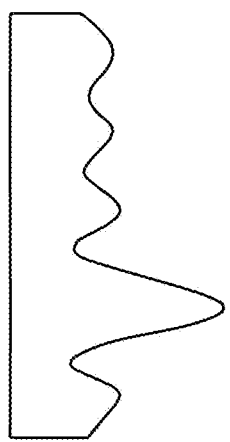
FIG. 15C is an enlarged cross-sectional view of an example of the reflection surface of a reflector according to Embodiment 3.

FIG. 15C is an enlarged cross-sectional view of an example of the actual reflection surface of reflector 24a.

As illustrated in FIG. 15C, the reflection surface of reflector 24a is a bumpy surface where spatial frequencies include 1 to 5 with the same strength in the spatial frequency range.

Note that it is more preferable that the reflection surface of reflector 24a be a bumpy surface in a random form in terms of reducing the influence of interference fringes on the image of a measurement target formed on image sensor 31.

Hereinafter, a specific example of the structure of the reflection surface of reflector 24a will be described.

The reflection surface of reflector 24a has unit areas each of which has the width of at least ϕ×b/c. Each of the unit areas is described herein as an area whose shape viewed along a direction perpendicular to the tangent plane of a spheroid in the macro perspective of the reflection surface is an approximate rectangle. The width of a unit area is a shorter distance out of the distance between longer sides facing each other and the distance between shorter sides facing each other of the unit area that is an approximate rectangle. Although it is described herein that the reflection surface of reflector 24a has a plurality of unit areas, the reflection surface does not necessarily need to be limited to such an example in which the number of unit areas is plural, and needs to have at least one unit area.

Figure 16A:
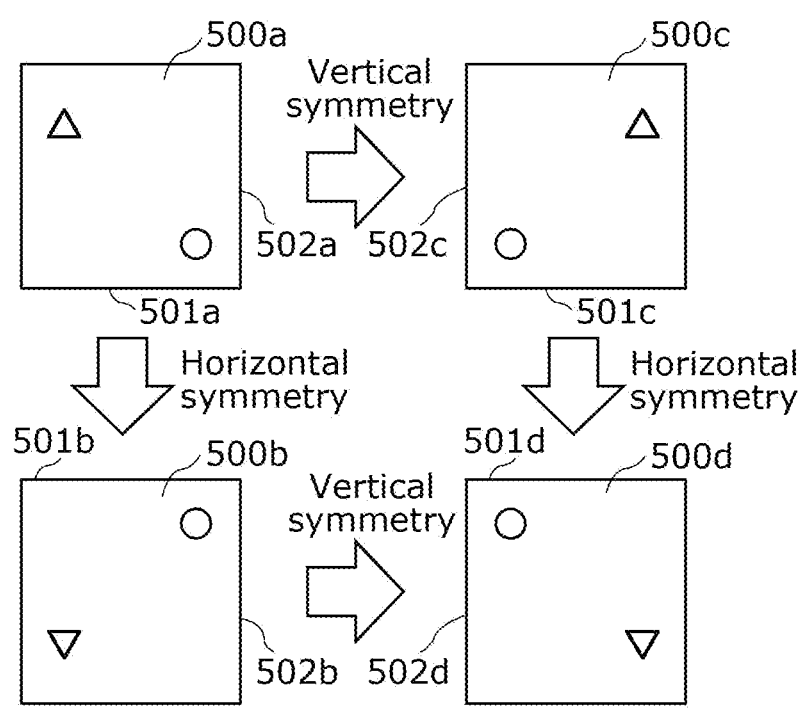
FIG. 16A is a plan view of unit areas according to Embodiment 3.

FIG. 16A is a plan view of unit areas 500 (i.e., unit area 500a to unit area 500d) included in the reflection surface of reflector 24a when viewed along a direction perpendicular to the tangent plane of a spheroid in the macro perspective of the reflection surface. A location at which each tangent plane comes in contact with the spheroid is at the center of a corresponding one of rectangles illustrated as unit area 500a to unit area 500d in FIG. 16A.

Each of unit areas 500 is composed of a bumpy surface that includes at least two frequency components in the frequency range of at most ϕ'/λ in a spatial frequency range when λ denotes the wavelength of sub-terahertz waves emitted from point light source 21a.

Figure 16B:
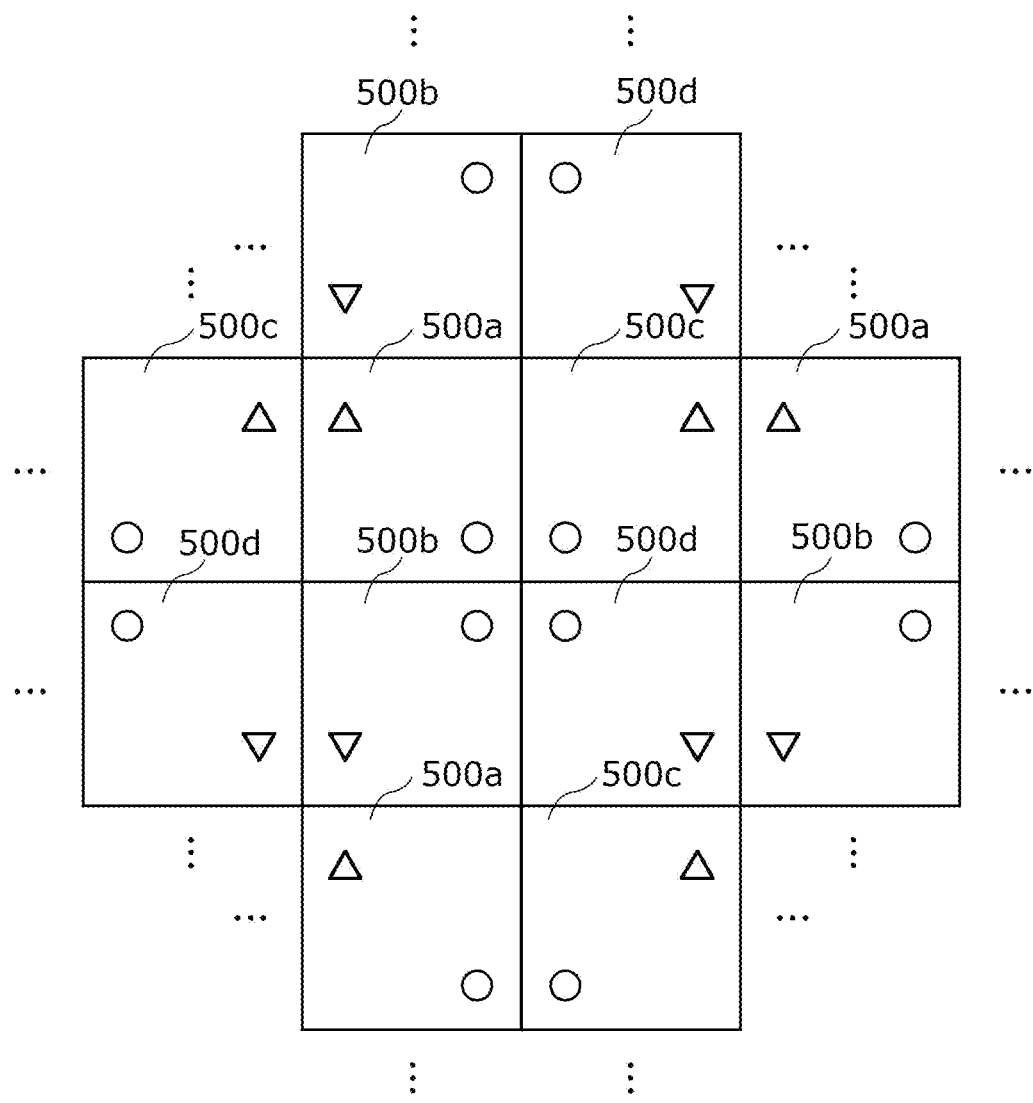
FIG. 16B is a schematic diagram illustrating how the unit areas are arranged on the reflection surface of the reflector according to Embodiment 3.

FIG. 16B is a schematic diagram illustrating how unit areas 500 are arranged on the reflection surface of reflector 24a.

On the reflection surface of reflector 24a, unit area 500a and unit area 500b share, as a side, side 501a of unit area 500a and side 501b of unit area 500b, and are disposed in contact with each other at the side, as illustrated in FIG. 16A and FIG. 16B. The geometry of the bumpy surface of unit area 500a and the geometry of the bumpy surface of unit area 500b are line symmetric about the side serving as an axis of symmetry.

On the reflection surface of reflector 24a, unit area 500a and unit area 500c share, as a side, side 502a of unit area 500a and side 502c of unit area 500c, and are disposed in contact with each other at the side. The geometry of the bumpy surface of unit area 500a and the geometry of the bumpy surface of unit area 500c are line symmetric about the side serving as an axis of symmetry.

On the reflection surface of reflector 24a, unit area 500b and unit area 500d share, as a side, side 502b of unit area 500b and side 502d of unit area 500d, and are disposed in contact with each other at the side. The geometry of the bumpy surface of unit area 500b and the geometry of the bumpy surface of unit area 500d are line symmetric about the side serving as an axis of symmetry.

On the reflection surface of reflector 24a, unit area 500c and unit area 500d share, as a side, side 501c of unit area 500c and side 501d of unit area 500d, and are disposed in contact with each other at the side. The geometry of the bumpy surface of unit area 500c and the geometry of the bumpy surface of unit area 500d are line symmetric about the side serving as an axis of symmetry.

Unit area 500a to unit area 500d are thus arranged on the entire reflection surface of reflector 24a without any space left, as illustrated in FIG. 16B.

With the above configuration, the reflection surface of reflector 24a achieves, for any area whose width is ϕ', a bumpy surface that includes at least two frequency components in the frequency range of at most ϕ'/λ in a spatial frequency range when λ denotes the wavelength of sub-terahertz waves emitted from point light source 21a.

Referring back to FIG. 14, the description of imaging device 10b continues.

In FIG. 14, angle θ1 denotes an angle that is the half width at half maximum of the strength of sub-terahertz waves in diffuse reflection at any location on reflector 24a.

As illustrated in FIG. 14, imaging range 110 is located within the range of angle θ1. In other words, angle θ1 satisfies Expression 5 indicated below.

[Math. 7]

$$\theta 1 > \tan^{-1} \frac{a}{2b} \qquad \text{Expression 5}$$

This reduces variance in the strengths of sub-terahertz waves irradiated by reflector 24a to half or less in imaging range 110.

Hereinafter, the bumpy structure of the reflection surface of reflector 24a which satisfies Expression 5 will be described.

Figure 17:
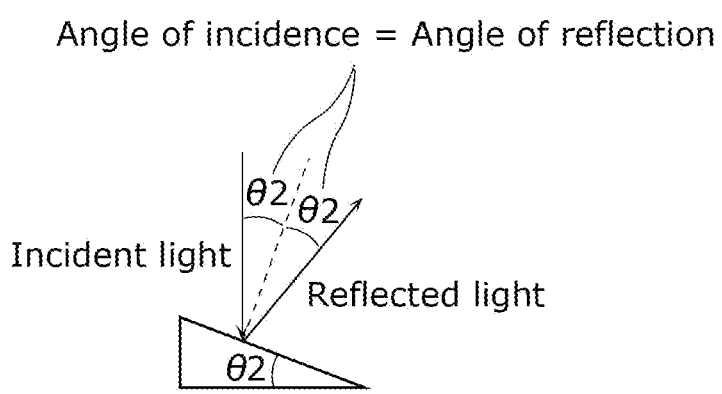
FIG. 17 is a schematic diagram illustrating a cross section of an inclined portion of a bump on the reflection surface according to Embodiment 3.

FIG. 17 is a schematic diagram illustrating a cross section of an inclined portion of a bump on the reflection surface of reflector 24a.

When a sub-terahertz wave perpendicular to the tangent plane of a spheroid is incident on the bumpy structure by which an angle of inclination relative to the tangent plane in the macro perspective of the reflection surface is θ2, the angle of a reflected wave relative to the incident wave is 2θ2, as illustrated in FIG. 17.

Accordingly, in order to satisfy Expression 5, angle θ2 that is the half width at half maximum of the distribution of inclination angles in the bumpy structure on the reflection surface of reflector 24a satisfies Expression 6 indicated below.

[Math. 8]

$$\theta 2 > \frac{1}{2} \times \tan^{-1}\left(\frac{a}{2b}\right) \qquad \text{Expression 6}$$

This reduces variance in the strengths of sub-terahertz waves irradiated by reflector 24a to half or less in imaging range 110.

Hereinafter, the upper limit of roughness curve element mean length RSm of the reflection surface of reflector 24a will be looked at.

Figure 18A:
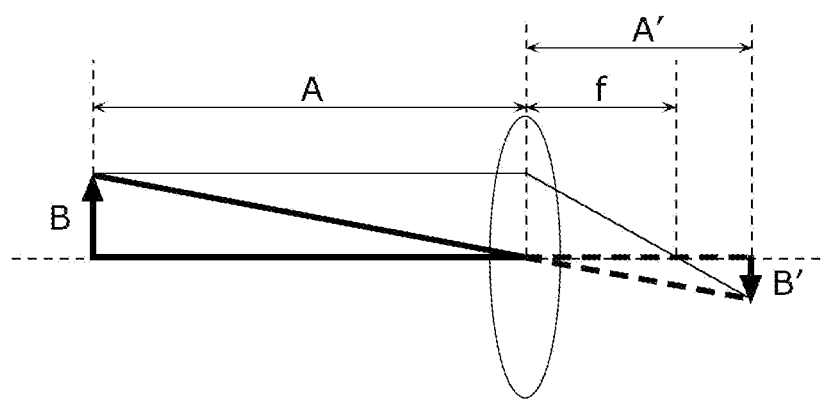
FIG. 18A is a schematic diagram illustrating the relationship between a subject and the actual image of the subject in an optical system according to Embodiment 3.
Figure 18B:
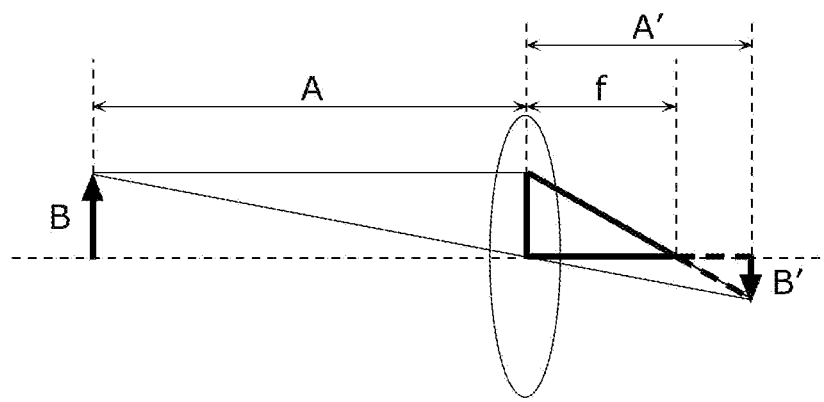
FIG. 18B is a schematic diagram illustrating the relationship between a subject and the actual image of the subject in the optical system according to Embodiment 3.

FIG. 18A and FIG. 18B are schematic diagrams each illustrating the relationship between a subject and the actual image of the subject in optical system 32.

In FIG. 18A or FIG. 18B, focal distance f is the focal distance of optical system 32, distance A is the distance from optical system 32 to the subject, height B is the height of the subject, distance A' is the distance from optical system 32 to the actual image of the subject formed by optical system 32, and height B is the height of the actual image.

Equation 7 indicated below holds true based on the fact that a triangle in a thick solid line is similar to a triangle in a thick dashed line in FIG. 18A.

$$A:A'=B:B' \qquad \text{Equation 7}$$

Equation 8 indicated below holds true based on the fact that a triangle in a thick solid line is similar to a triangle in a thick dashed line in FIG. 18B.

$$B:B'=f:A'-f \qquad \text{Equation 8}$$

The following is derived from Equation 7 and Equation 8: A:A'=f:A'-f. Equation 9 indicated below therefore holds true.

$$A'=f \times A/(A-f) \qquad \text{Equation 9}$$

Figure 18C:
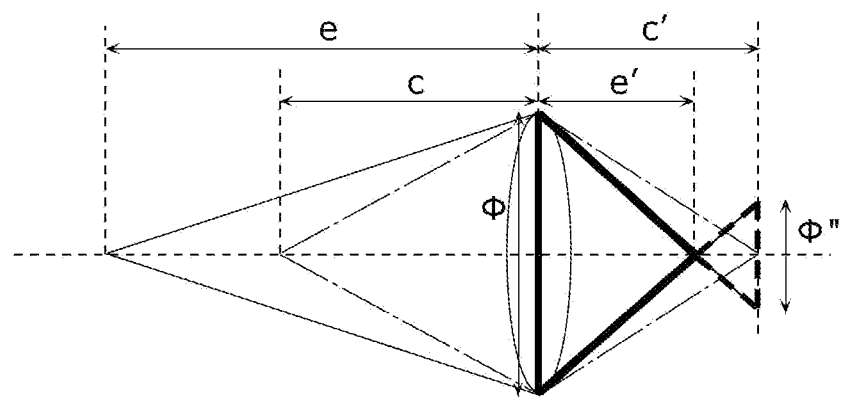
FIG. 18C is a schematic diagram illustrating how dots located in an imaging sub-terahertz wave emission area according to Embodiment 3 form an image on an image sensor.
Figure 18D:
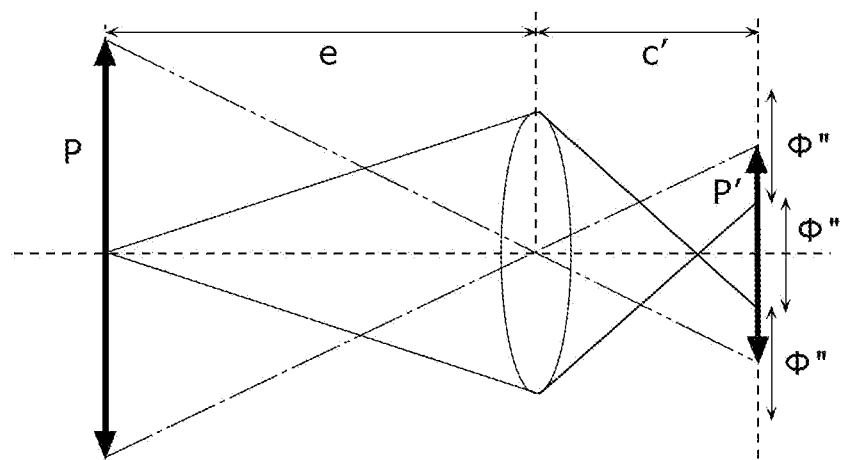
FIG. 18D is a schematic diagram illustrating how dots located in the imaging sub-terahertz wave emission area according to Embodiment 3 form an image on the image sensor.

FIG. 18C and FIG. 18D are schematic diagrams each illustrating how dots located in imaging sub-terahertz wave emission area 120 form an image on image sensor 31 by optical system 32.

In FIG. 18C or FIG. 18D, distance c is the distance between imaging range 110 and optical system 32, distance e is the distance between imaging sub-terahertz wave emission area 120 and optical system 32, that is, a sum of distance c and distance b which is the distance between imaging sub-terahertz wave emission area 120 and imaging range 110, distance c' is the distance between optical system 32 and image sensor 31, distance e' is the distance between optical system 32 and the location at which dots located in imaging sub-terahertz wave emission area 120 form an image, and width $\phi''$ is the width of the image, which is formed on image sensor 31, of the dots located in imaging sub-terahertz wave emission area 120, that is, a width showing the spread of the blurred image, which is formed on image sensor 31, of the dots located in imaging sub-terahertz wave emission area 120. In FIG. 18D, length P is roughness curve element mean length RSm of the reflection surface of reflector 24a, and height P' is the height of the actual image of a subject with height P at the location of first emission surface 22a, that is, a subject whose height is roughness curve element mean length RSm of the reflection surface of reflector 24a.

The following is derived based on the fact that a triangle in a thick solid line is similar to a triangle in a thick dashed line in FIG. 18C: $\phi$: $\phi''=e':c'-e'$. Equation 10 indicated below therefore holds true.

$$\phi'=\phi \times (c'-e')/e' \qquad \text{Equation 10}$$

Moreover, Equation 11 and Equation 12 indicated below hold true based on Equation 9.

$$c'=f \times c/(c-f) \qquad \text{Equation 11}$$

$$e'=f \times e/(e-f) \qquad \text{Equation 12}$$

The following is derived based on the fact that a triangle in a thick solid line is similar to a triangle in a thick dashed line in FIG. 18D: P:P'=e:c'. Equation 13 indicated below therefore holds true.

$$P'=c' \times P/e \qquad \text{Equation 13}$$

When a subject with height P, that is, a subject whose height is roughness curve element mean length RSm of the reflection surface of reflector 24a is on the reflection surface of reflector 24a, that is, in imaging sub-terahertz wave emission area 120, due to blurred dots at the both ends and the center of the subject with height P, the image of a circle having width $\phi''$ is formed on image sensor 31 but the image is not resolved if blurs at the both ends of the image overlaps a blur at the center of the image. Based on this, Expression 14 indicated below holds true so that the subject with height P is not resolved.

$$\phi''/2+\phi''+\phi''/2>P \qquad \text{Expression 14}$$

The following formula holds true based on Equations 10 to 13 and Expression 14.

$$P<2 \times \phi(e-c)/c$$

Since distance e here is a sum of distance b and distance c, Expression 15 indicated below holds true.

$$P<2 \times \phi \times b/c \qquad \text{Expression 15}$$

As can be seen from Expression 15, it is desirable that roughness curve element mean length RSm of the reflection surface of reflector 24a be less than $2 \times \phi \times b/c$ so that the structure of the bumpy surface that is the reflection surface of reflector 24a does not resolve an image.

Other Embodiments

As described above, the imaging device according to an aspect of the present disclosure has been described based on Embodiment 1 or Embodiment 2, but the present disclosure is not limited to these embodiments. Various modifications to the embodiments which may be conceived by those skilled in the art, as well as embodiments resulting from arbitrary combinations of elements from different embodiments may be included within the scope of one or more aspects of the present disclosure so long as they do not depart from the essence of the present disclosure.

(1) Embodiment 2 has described that imaging device 10a includes: first light source 20a including optical element 23a having first emission surface 22a which is the inner surface of a spheroid; and second light source 20b including optical element 23b having second emission surface 22b which is the inner surface of a spheroid. In contrast, an imaging device according to a variation that is another example of an aspect of the present disclosure may include: instead of optical element 23a, a first light source according to the variation which includes first emission surface 22a whose shape has been changed from the inner surface of part of a spheroid to the inner surface of part of a sphere; and instead of optical element 23b, a second light source according to the variation which includes second emission surface 22b whose shape has been changed from the inner surface of part of a spheroid to the inner surface of part of a sphere, as modified from imaging device 10a according to Embodiment 2.

Figure 19:
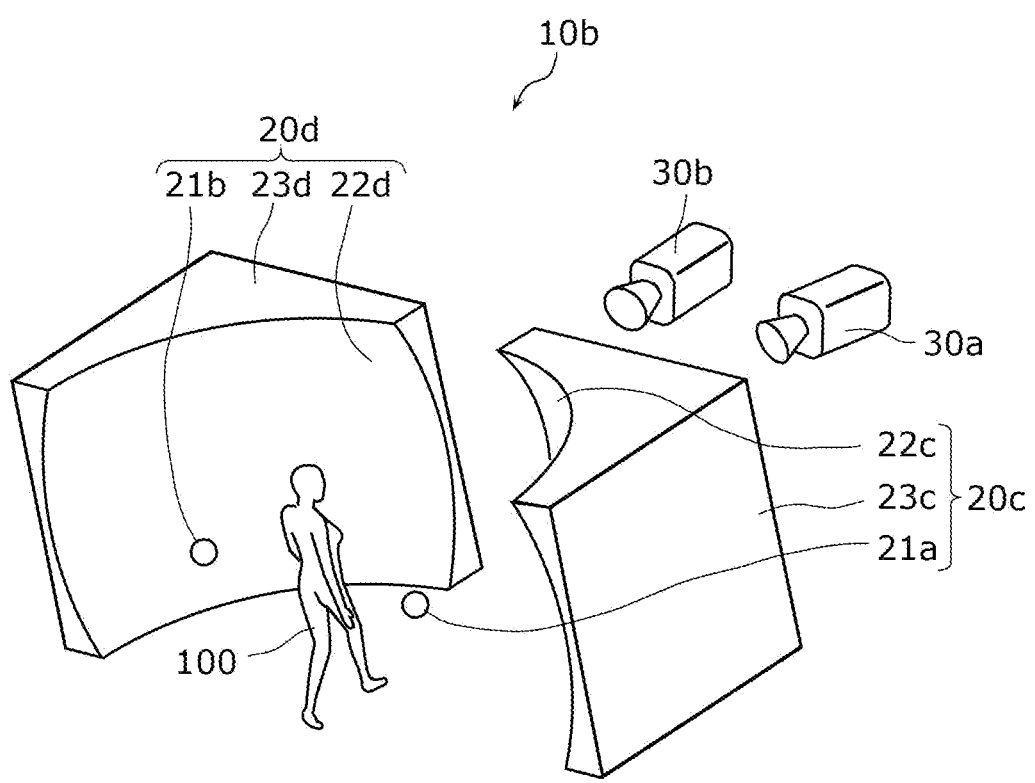
FIG. 19 is a schematic diagram illustrating part of an outer appearance of an imaging device according to a variation.

FIG. 19 is a schematic diagram illustrating part of an outer appearance of the imaging device according to the variation.

In imaging device 10b according to the variation, first light source 20c according to the variation includes point light source 21a and optical element 23c having first emission surface 22c which is the inner surface of part of a sphere, as illustrated in FIG. 19. Point light source 21a is disposed in the vicinity of the center of the sphere. Second light source 20d according to the variation includes point light source 21b and optical element 23d having second emission surface 22d which is the inner surface of part of the sphere. Point light source 21b is disposed in the vicinity of the center of the sphere.

(2) Embodiment 1 has described that optical element 23 includes diffuser 24. In contrast, optical element 23 may be diffuser 24 per se, as another example. In this case, the surface of diffuser 24 is emission surface 22.

(3) Embodiment 2 has described that optical element 23a and optical element 23b include reflector 24a and reflector 24b, respectively. In contrast, optical element 23a and optical element 23b may be reflector 24a per se and reflector 24b per se, respectively. In this case, the reflection surface of reflector 24a and the reflection surface of reflector 24b are first emission surface 22a and second emission surface 22b, respectively.

(4) Embodiment 1 has described that light source 20 includes one point light source 21. However, the number of point light sources included in light source 20 does not need to be limited to one and may be plural. In this case, optical element 23 generates, from sub-terahertz waves emitted from a plurality of point light sources, sub-terahertz waves to be emitted from emission surface 22.

(5) Embodiment 2 has described that first light source 20a and second light source 20b respectively include one point light source 21a and one point light source 21b. However, the number of point light sources included in first light source 20a or second light source 20b does not need to be limited to one and may be plural. In this case, optical element 23a and optical element 23b generate, from sub-terahertz waves emitted from a plurality of point light sources, sub-terahertz waves to be emitted from first emission surface 22a and sub-terahertz waves to be emitted from second emission surface 22b, respectively.

(6) Embodiment 2 has described that first emission surface 22a and second emission surface 22b are each the inner surface of a spheroid. First emission surface 22a and second emission surface 22b, however, are not necessarily limited to an example where first emission surface 22a and second emission surface 22b are each the inner surface of a spheroid in an accurate sense, and may be, for example, a polyhedron composed of multiple micro-polygons approximated to a spheroid.

(7) Embodiment 3 has described that each of one or more unit areas 500 is an approximate rectangle when viewed along a direction perpendicular to the tangent plane of a spheroid in the macro perspective of the reflection surface of reflector 24a. Each of one or more unit areas 500, however, does not necessarily need to be an approximate rectangle so long as unit area 500 can cover the entire reflection surface of reflector 24a without any space left. For example, each of one or more unit areas 500 may be an approximate regular hexagon when viewed along a direction perpendicular to the tangent plane of a spheroid in the macro perspective of the reflection surface of reflector 24a. In this case, the width of a unit area is the distance between sides of the approximate regular hexagon which face each other.

(8) An aspect of the present disclosure may be not only the imaging device according to Embodiment 1 to Embodiment 3, but also an imaging method implementing steps performed by characteristic components included in the imaging device. In addition, an aspect of the present disclosure may be a program causing a computer to execute each of the characteristic steps included in the imaging method. Moreover, an aspect of the present disclosure may be a non-transitory computer-readable recording medium having such a program recorded thereon.

INDUSTRIAL APPLICABILITY

The present disclosure can be widely used for imaging devices that image objects.

The invention claimed is:

1. An imaging device comprising:
an area light source including an emission surface from which a sub-terahertz wave is emitted to a measurement target; and
a detector including an image sensor that receives a reflected wave generated by the measurement target reflecting the sub-terahertz wave emitted from the emission surface,
wherein the area light source includes:
at least one point light source that emits a sub-terahertz wave; and
a reflector that diffusely reflects the sub-terahertz wave emitted from the at least one point light source, to generate a sub-terahertz wave to be emitted from the emission surface, the reflector including a reflection surface that is a bumpy surface which is of a shape in which a plurality of protruding portions having mutually different shapes and a plurality of recessed portions having mutually different shapes are randomly arranged, includes two or more frequency components in a spatial frequency range and whose roughness curve element mean length RSm is at least 0.3 mm.

2. The imaging device according to claim 1, wherein the detector includes an optical system that forms an image on the image sensor by an optical focus of the reflected wave, and
when $\Phi$ denotes an entrance pupil diameter of the optical system, b denotes a distance between the emission surface and the measurement target, c denotes a distance between the measurement target and the optical system, and $\lambda$ denotes a wavelength of the sub-terahertz wave emitted from the at least one point light source:
the reflection surface includes one or more unit areas each of which has a bumpy surface including at least two frequency components in a frequency range of at most $(\Phi \times b/c)/\Xi$ in a spatial frequency range;
a width of each of the one or more unit areas is at least $\Phi \times b/c$; and
the roughness curve element mean length RSm is less than $2 \times \Phi \times b/c$.

3. The imaging device according to claim 2, wherein:
the one or more unit areas include a first unit area and a second unit area;
the first unit area and the second unit area are in contact with each other at a side shared between the first unit area and the second unit area; and
a geometry of a bumpy surface of the first unit area and a geometry of a bumpy surface of the second unit area are line symmetric about the side serving as an axis of symmetry.

4. The imaging device according to claim 1, wherein an angle $\theta 1$ that is a half width at half maximum of a strength of the sub-terahertz wave in the diffuse reflection by the reflector is at least a value obtained using the following formula:

[Math. 1]
$$\tan^{-1}\left(\frac{a}{2b}\right)$$

where a denotes a width of an imaging range of the measurement target and b denotes a distance between the emission surface and the measurement target.

5. The imaging device according to claim 1, wherein an angle θ2 that is a half width at half maximum in a distribution of inclination angles of bumps on the reflection surface is at least a value obtained using the following formula:

[Math. 2]
$$\frac{1}{2}\times\tan^{-1}\left(\frac{a}{2b}\right)$$

where a denotes a width of an imaging range of the measurement target and b denotes a distance between the emission surface and the measurement target.

6. An imaging device comprising:
an area light source including an emission surface from which a sub-terahertz wave is emitted to a measurement target; and
a detector including an image sensor that receives a reflected wave generated by the measurement target reflecting the sub-terahertz wave emitted from the emission surface, and an optical system that forms an image on the image sensor by an optical focus of the reflected wave,
wherein the area light source includes:
at least one point light source that emits a sub-terahertz wave; and
a reflector that diffusely reflects the sub-terahertz wave emitted from the at least one point light source, to generate a sub-terahertz wave to be emitted from the emission surface, the reflector including a reflection surface that is a bumpy surface whose roughness curve element mean length RSm is at least 0.3 mm, wherein
when Φ denotes an entrance pupil diameter of the optical system, b denotes a distance between the emission surface and the measurement target, c denotes a distance between the measurement target and the optical system, and λ denotes a wavelength of the sub-terahertz wave emitted from the at least one point light source:
the reflection surface includes one or more unit areas each of which has a bumpy surface including at least two frequency components in a frequency range of at most (Φ×b/c)/Ξ in a spatial frequency range.

7. The imaging device according to claim 6, wherein a width of each of the one or more unit areas is at least Φ×b/c; and
the roughness curve element mean length RSm is less than 2×Φ×b/c.

8. The imaging device according to claim 6, wherein:
the one or more unit areas include a first unit area and a second unit area;
the first unit area and the second unit area are in contact with each other at a side shared between the first unit area and the second unit area; and
a geometry of a bumpy surface of the first unit area and a geometry of a bumpy surface of the second unit area are line symmetric about the side serving as an axis of symmetry.

9. The imaging device according to claim 6, wherein an angle θ1 that is a half width at half maximum of a strength of the sub-terahertz wave in the diffuse reflection by the reflector is at least a value obtained using the following formula:

$$\tan^{-1}\left(\frac{a}{2b}\right) \qquad \text{[Math. 3]}$$

where a denotes a width of an imaging range of the measurement target.

10. The imaging device according to claim 6, wherein an angle θ2 that is a half width at half maximum in a distribution of inclination angles of bumps on the reflection surface is at least a value obtained using the following formula:

$$\frac{1}{2}\times\tan^{-1}\left(\frac{a}{2b}\right) \qquad \text{[Math. 4]}$$

where a denotes a width of an imaging range of the measurement target.

* * * * *